US012589668B2

(12) United States Patent
Benfold et al.

(10) Patent No.: US 12,589,668 B2
(45) Date of Patent: Mar. 31, 2026

(54) APPARATUS AND METHOD FOR CHARGING A LOAD HANDLING DEVICE

(71) Applicant: Ocado Innovation Limited, Hatfield (GB)

(72) Inventors: James Benfold, Hatfield (GB); Robert Stadie, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 901 days.

(21) Appl. No.: 17/796,486

(22) PCT Filed: Jan. 26, 2021

(86) PCT No.: PCT/EP2021/051773
§ 371 (c)(1),
(2) Date: Jul. 29, 2022

(87) PCT Pub. No.: WO2021/151903
PCT Pub. Date: Aug. 5, 2021

(65) Prior Publication Data
US 2023/0347770 A1 Nov. 2, 2023

(30) Foreign Application Priority Data

Jan. 30, 2020 (GB) ...................................... 2001297
Jul. 10, 2020 (GB) ...................................... 2010701

(51) Int. Cl.
*H02J 7/14* (2006.01)
*B60L 53/34* (2019.01)
(Continued)

(52) U.S. Cl.
CPC ............... *B60L 53/35* (2019.02); *B60L 53/34* (2019.02); *B65G 1/0478* (2013.01)

(58) Field of Classification Search
CPC ........ B60L 53/35; B60L 53/34; B65G 1/0478
(Continued)

(56) References Cited

U.S. PATENT DOCUMENTS 6,572,319 B1* 6/2003 Simmons, III .......... B63B 27/16
414/142.8
7,381,022 B1* 6/2008 King .................... B65G 1/1375
414/807
(Continued)

FOREIGN PATENT DOCUMENTS

WO 2015019055 A1 2/2015
WO 2015104263 A2 7/2015
(Continued)

OTHER PUBLICATIONS

International Search Report (PCT/ISA/210) and Written Opinion (PCT/ISA/237) mailed on Apr. 26, 2021, by the European Patent Office as the International Searching Authority for International Application No. PCT/EP2021/051773. (14 pages).
(Continued)

*Primary Examiner* — Alexis B Pacheco
(74) *Attorney, Agent, or Firm* — Gregory Matt McCloskey

(57) ABSTRACT

A load handling device is disclosed for lifting and moving containers stacked in a storage system having a grid framework structure supporting a pathway arranged in a grid pattern above the stacks of containers. The load handling device includes a vehicle body housing a driving mechanism, the driving mechanism being powered by a rechargeable power source electrically coupled to an electrical charge point for electrically coupling with a charge head of a charge station; and a lifting device having a lifting drive assembly and a grabber device, wherein the lifting device includes the electrical charge point such that charging of the
(Continued)

30 rechargeable power source occurs by the lifting device engaging with the charge head.

33 Claims, 18 Drawing Sheets

(51) Int. Cl.
    B60L 53/35         (2019.01)
    B65G 1/04          (2006.01)
    H02J 7/00          (2006.01)

(58) Field of Classification Search
    USPC .......................................................... 320/134
    See application file for complete search history.

(56)             References Cited

U.S. PATENT DOCUMENTS

| | | | |
|---|---|---|---|
| 2010/0071979 A1* | 3/2010 | Heichal ................... | B60L 50/51 |
| | | | 180/68.5 |
| 2019/0263589 A1 | 8/2019 | Clarke et al. | |
| 2020/0216263 A1* | 7/2020 | Fjeldheim ............ | B65G 1/0464 |
| 2020/0307911 A1* | 10/2020 | Austrheim ............ | B65G 1/137 |
| 2020/0346864 A1* | 11/2020 | Fjeldheim ................ | B66C 1/101 |
| 2020/0391941 A1* | 12/2020 | Austrheim ........... | B65G 1/0492 |
| 2021/0114808 A1* | 4/2021 | Austrheim ........... | B65G 1/0464 |
| 2021/0139239 A1* | 5/2021 | Austrheim ........... | B65G 1/0492 |
| 2021/0147145 A1* | 5/2021 | Austrheim ........... | B65G 1/1378 |
| 2021/0147201 A1* | 5/2021 | Austrheim .............. | B66C 11/12 |
| 2021/0155408 A1* | 5/2021 | Austrheim ........... | B65G 1/0464 |
| 2021/0170895 A1* | 6/2021 | Austrheim ........... | B65G 1/0464 |
| 2021/0179351 A1* | 6/2021 | Austrheim ........... | B65G 1/0428 |
| 2021/0214199 A1* | 7/2021 | Austrheim ............. | G05D 1/692 |
| 2021/0371202 A1* | 12/2021 | Austrheim ............. | G05B 11/01 |

FOREIGN PATENT DOCUMENTS

| | | |
|---|---|---|
| WO | 2015140216 A1 | 9/2015 |
| WO | 2015185628 A2 | 12/2015 |
| WO | 2018073392 A1 | 4/2018 |
| WO | 2019206438 A1 | 10/2019 |
| WO | 2019215221 A1 | 11/2019 |
| WO | 2019238702 A1 | 12/2019 |

OTHER PUBLICATIONS

Search Report under Sections 17 Letter in corresponding Application No. GB2001297.7 dated Jun. 25, 2020.
Search Report under Sections 17 in corresponding Application No. GB2001297.7 dated Jun. 24, 2020.
Search Report under Sections 17 in corresponding Application No. GB2101059.0 dated Jun. 28, 2021.
Search Report under Sections 17 Letter in corresponding Application No. GB2101059.0 dated Jun. 29, 2021.

* cited by examiner

62

56

60

58

56

60

63

30

74

70

76

72

APPARATUS AND METHOD FOR CHARGING A LOAD HANDLING DEVICE

TECHNICAL FIELD

The present invention relates to the field of load handling devices for handling storage containers or bins in a store comprising a grid of stacked containers, more specifically to an apparatus and method for charging the load handling device.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices operative on tracks located on the top of the grid framework structure. A storage system 1 of this type is illustrated schematically in FIGS. 1 to 3 of the accompanying drawings.

As shown in FIGS. 1 and 2, stackable containers, known as bins 10, are stacked on top of one another to form stacks 12. The stacks 12 are arranged in a grid framework structure 14 in a ware-housing or manufacturing environment. The grid framework structure 14 is made up of a plurality of storage columns or grid columns. Each grid in the grid framework structure 14 has at least one grid column for storage of a stack of containers. FIG. 1 is a schematic perspective view of the grid framework structure 14, and FIG. 2 is a top-down view showing a stack 12 of bins 10 arranged within the grid framework structure 14. Each bin 10 typically holds a plurality of product items (not shown), and the product items within a bin 10 may be identical, or may be of different product types depending on the application.

The grid framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10. The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIG. 4 comprises a vehicle 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting a pair of wheels on the front of the vehicle 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction.

The load handling device (not shown) is equipped with a lifting device or crane device to lift a storage container from above. The lifting device comprise a set of lifting tethers extending in a vertical direction and connected at the four corners of a lifting frame (not shown), otherwise known as a grabber device (one tether near each of the four corners of the grabber device) for releasable connection to a storage container. The grabber device is configured to releasably grip the top of a storage container to lift it from a stack of containers in a storage system of the type shown in FIGS. 1 and 2.

Although not shown in FIGS. 1-3, the load handling device 30 is powered during operation by an on-board rechargeable battery. Examples of rechargeable batteries are Lithium-Ion battery, Nickel-Cadmium battery, Nickel-Metal Hydride battery, Lithium-Ion Polymer battery, Thin Film battery and Smart battery Carbon Foam-based Lead Acid battery. The battery is recharged while the load handling device 30 is operative on the grid framework structure 14 by a charge station 50 shown in FIG. 5. The charge station 26 is typically an L shaped structure that is fixed proximate to the grid framework structure 14 and extends over a nominal grid cell at an edge of the grid structure. The charge station comprises a charge head 52 comprising charge contacts which are fixed in position relative to the charge station. The charge head is mounted to one arm 54 of the L shaped structure such that the charge head 52 is suspended over at least two grid spaces of the grid framework structure. A load handling device may be charged by being instructed to move to a grid cell above which the charge head is located. As the load handling device moves into the grid cell, a contact is made between a charge contact pad on a top surface of the load handling device, and the charge contacts of the charge head 52. A charge is imparted to the load handling device from the charge contacts through the charge contact pad situated on the top surface of the load handling device.

However, a number of problems exist with the charge station. In particular, due to the movement of the robotic load handling device into the charge station, a clamping force exists between the charge contacts and the robotic load handling device. However, the magnitude of this force can cause problems to arise over a period of time. For example, repeated entries of the robotic load handling device into the grid cell above which the charge station is located causes a fatiguing of the charge station which will then require maintenance or replacement of the charge head and supporting structure. Moreover, vibration of the grid framework structure caused by movement of the robotic load handling devices negatively affects the alignment between the charge contacts of the charge station and the robotic load handling device. Moreover, grid cell damage, wear and material creep causes alignment issues between the charge contacts and the charge pad contacts negatively affecting the ability of the robotic load handling device to make contact with the charge contacts. Similarly, tolerances in both the manufacture of the grid framework structure and charge station and/or slight variation in installation alignment of the grid framework structure with respect to the charge station and/or thermal expansion of the grid framework structure with respect to the charge station can also cause alignment issues which negatively affect the ability of the robotic load handling device to make contact with the charge contacts. Moreover, the charge contacts wear with time and therefore, require periodic servicing or repair. However, the maintenance of the charge contacts requires human intervention on the top of the grid framework structure which can only be performed if the robotic load handling devices on top of the grid framework structure are in a "safe mode" rendering them inoperable. The downtime as a result of the load handling device being idle leads to a loss of production of the whole system.

PCT/EP2019/061808 (Ocado Innovation Limited) addresses this problem by providing a charge station in which a charge head 56 is drawn towards the charge pad on the top surface of the load handling device. The charge unit (see FIGS. 6a and 6b) comprises a plurality of profiled sections 58, 60 arranged to interface with a hoist element 70 of the handling device 30 (see FIG. 7) and a power transfer component 62 arranged to transfer power to the load handling device when the hoist element 70 engages with the plurality of profiled sections 58, 60. FIG. 7 shows a hoist element 70 used for manual movement of the load handling device 30. The hoist element 70 comprises a cutaway below a bulbous head which gives rise to an underside 72. The hoist element 70 is so designed to permit the attachment of a hoist to lift the load handling device 30 from a grid cell. The power transfer component 62 is typically composed of copper and outwardly biased by a resiliently member, e.g. a spring, so as to lessen the impact of the power transfer unit 62 making contact with a charge pad 74 on the top surface 76 of the load handling device 30. In addition to the power transfer unit 62, the cartridge 56 comprises a plurality of charge contacts 63 on its underside. Like the power transfer unit 62, the plurality of charge contacts 63 are outwardly biased by resilient member, e.g. a spring, so as to lessen the impact of the charge contacts 63 making contact with the charge pad 74 on the top surface 76 of the load handling device 30. In contrast to the power transfer units 62, the additional charge contacts may be for the purpose of preventing arcing between the power transfer units or data transfer during charging.

The plurality of profiled sections 58, 60 and the power transfer unit 62 are arranged in a moveable cartridge 56 such that contact between the hoist element 70 and the plurality of profiled sections 58, 60 causes movement of the cartridge 56 towards the load handling device and thereby, control the amount of clamping force of the cartridge 56, in particular the power transfer unit 62 with the charge pad 74 at the top surface of the robotic load handling device. Together with the resiliently biased power transfer units 62 and/or the plurality of resiliently biased charge contacts 63, damage/wear to the cartridge and/or the top surface of the robotic load handling device is minimised.

However, the increased number of components of the cartridge such as the plurality of profiled sections not only increases the complexity of the charge station but renders the charging station costly to service should any one of the components require repairing or to be replaced. Moreover, since the cartridge needs to be suspended above the load handling loading device during charging, the cartridge would need to be externally mounted to a dedicated support structure. Such a support structure presents an unsightly obstacle and is an eyesore amongst the grid framework structure. In some cases, the structure supporting the charge head obscures the view of the grid framework structure and the load handling devices traversing on the grid framework structure. Furthermore, the need to suspend the cartridge above the load handling device runs the risk of potentially causing alignment issues between the charge contacts of the cartridge and the hoist element of the load handling device during a charging regime. In an extreme case, this can lead to improper seating of the hoist element with the profiled sections of the charge head resulting in improper electrical coupling between the charge contacts on the top surface of the load handling device and the cartridge of the charging station resulting in either inadequate or prolonged charging of the battery. Other considerations where misalignment of the load handling device with the charge station that can negatively impact the proper operation of the load handling device is the risk of arcing between the power transfer components of the charge station and the charge contacts of the load handling device.

In WO2019/238702 (Autostore Technology AS) charge receiving elements for charging the battery is mounted to the underside of a container vehicle or load handling device and is arranged to electrically couple with charge providing elements of a charge station located within a single grid cell at a level below the rails on the grid framework structure. In operation, the container vehicle or the load handling device is moved to a position above the charging station such that the charge receiving elements on the underside of the container vehicle is directly above the charge providing elements of the charge station within a grid cell; more specifically their corresponding contact surfaces are directly facing each other. Electrical contact or coupling is achieved by lowering the container vehicle vertically towards the rail grid, e.g. by vertically displacing a set of wheels of the container vehicle, such that the corresponding contact surfaces of the charge receiving elements and the charge providing elements mate. Lowering of the container vehicle towards the rail grid pushes the contact surfaces of the charge receiving elements to mate against the contact surfaces of the charge providing elements of the charge station. The charge receiving elements or the charge providing elements may be connected to a resilient assembly to bias the charge receiving elements or the charge providing elements in a vertical direction. Integrating the charge station within a single grid cell of the grid framework structure and at a level below the rails of the rail grid permits the charging station to be located anywhere on the rail grid without preventing movement of the container vehicle. The downside of the storage system taught in WO2019/238702 (Autostore Technology AS) is that it is necessary that the container vehicle is equipped with a crane device that comprises a cantilever arm that extends laterally from the top of the vehicle to accommodate a container receiving space, i.e. the container is accommodated beneath the cantilever arm and is held above the level of the rails. Equally, the vehicle needs to be sufficiently heavy to counterbalance the weight of a container and to remain stable during a lifting process. As a result, the container vehicle including the container receiving space has a footprint that extends over at least two grid cells.

A charging station is thus required that:
  i) has a footprint that does not occupy more than a single grid space or cell of a grid framework structure,
  ii) easy to manufacture comprising fewer moving parts;
  iii) does not present an unsightly obstacle amongst the grid framework structure, iv) does not suffer from alignment issues between the contact pads of the charge head and the charge receiving pads of the load handling device.

In addition to the above, a container vehicle or load handling vehicle for cooperation with the charging station is require that has a footprint of substantially only a single grid space or cell.

It is against this background that the present invention has been devised.

This application claims priority from UK Patent Application Nos. GB2001297.7 filed 30 Jan. 2020 and GB2010701.7 filed 10 Jul. 2020, the content of these applications hereby being incorporated by reference.

SUMMARY OF INVENTION

The present applicant has mitigated the above problem by providing a load handling device for lifting and moving containers stacked in a storage system comprising a grid framework structure supporting a pathway arranged in a grid pattern above the stacks of containers, the load handling device comprising:

a vehicle body housing a driving mechanism operatively arranged for maneuvering the load handling device along the pathway; said driving mechanism is powered by a rechargeable power source electrically coupled to an electrical charge point for electrically coupling to a charge head of a charge station, a lifting device comprising a lifting drive assembly and a grabber device configured, in use, to releasably grip a container and lift the container from a stack in the grid framework structure into a container-receiving space, characterised in that;

the lifting device comprises the electrical charge point such that in use charging of the rechargeable battery occurs by engaging the electrical charge point of the lifting device with the charge head of the charge station.

For the purpose of this patent specification, the storage system for the storage of goods, retrieval, processing and/or fulfilment of orders, wherein access to such goods is provided by fully or semi-automatic retrieval by the load handling devices is referred to as a grid framework structure or "hive". The grid framework structure or "hive" provides pathways in the form of a grid-layout for the movement of the load handling devices to traverse and perform operations at various location in the "hive". Preferably, the rechargeable power source may be a battery or a capacitor. The charge station is connected to a suitable power source charger, preferably a DC power source charger. For example, the power source charger comprises a rectifier to convert AC current to DC current. Preferably, the vehicle body is mounted on two sets of wheels, each of the two sets of wheels being arranged for engaging with the rails on the grid framework structure. Optionally, the vehicle body houses the lifting device comprising the lifting drive assembly and the grabber device such that the grabber device is configured, in use, to releasably grip a container and lift the container from a stack in the grid framework structure into a container-receiving space. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever. Optionally, the vehicle body houses the rechargeable power source. Optionally, the pathway comprises a plurality of rails or tracks. The plurality of rails or tracks are arranged in a grid pattern.

By adapting the lifting device for lifting and moving containers stacked in a storage system to additionally comprise an electrical charge point for electrically coupling with a charge head of a charge station, the lifting device is permitted to double up as an electrical charge point for charging the rechargeable power source. Preferably, the grabber device comprises the charge point of the lifting device. More preferably, the electrical charge point comprises at least two charge receiving pads connectable to at least two charge providing pads of the charge head. For the purpose of the present application, the contact surfaces of the charge providing pads and the charge receiving pads may also be termed current conducting surfaces since they conduct the electric current used to charge the rechargeable power source. Not only does such an adaptation simplify the make-up of the load handling device, since the need to have electrical contact pads mounted to the surface of a top wall of the load handling device is no longer required, but the adaptation also removes the need to have an externally mounted charge station suspending the charge head that is specially adapted to cooperate with the electrical charge point of the load handling device and thereby, mitigate potential misalignment issues with the charge head of the charge station. Other benefits include the removal of an externally mounted charge station proximate to the grid framework structure obscuring the view of the load handling devices on the grid framework structure and therefore, providing a "cleaner" grid framework structure with fewer obscurities. As a result of the adaptation of the lifting device to comprise the electrical charge point for charging the rechargeable power source allows the charge station to be integrated within the grid framework structure or hive, more specifically within a single grid space of the grid framework structure and therefore, occupies a space which is considered dead space within the grid framework structure.

For high volume operations involving multiple product lines arranged in storage containers or totes, the speed of operation of the load handling devices on the grid framework structure is critical to make sure that demand for the retrieval of storage items is met. To maximise the speed of operation of the load handling devices, the performance of each of the load handling devices on the grid framework structure needs to be maximised, in terms of battery or capacitor life, reliability, lifting capacity, stability and so on. As a result, the location of the charge station of the present invention being integrated within the grid framework structure has an influence on the speed of operation of the load handling devices, in particular during high volume operation involving multiple product lines. Locating the charge station proximate the grid framework structure, more specifically at the edge of the grid framework structure as found in prior art systems, generally has a negative impact on the speed of operation of the system since the load handling devices will have to travel relatively large distances across multiple grid spaces to dock onto the charge station, let alone to make sure that the charge point suitably aligns with charge head of the charge station. Locating multiple externally mounted charger stations at different locations around the edge of the grid framework structure to increase the speed of operation of the storage system and thereby, minimise the time the load handling devices remain idle will greatly obscure the view of the load handling devices operational on the grid framework structure. As the health of the load handling devices is monitored by CCTV cameras, such externally mounted charge stations may impact the monitoring of the load handling device in certain areas on the grid framework structure. By integrating the charger station within the grid structure, multiple charge stations can be accommodated within the grid framework structure without obscuring the view of the load handling devices traversing on the grid structure.

Preferably, the charge station is sized to fit inside a single grid space of the grid framework structure. Integrating the charge station of the present invention within the grid framework structure greatly increases the density of charge stations that can be accommodated by the grid framework structure and thereby, increases the accessibility of a nearby charge station for any given load handling device on the grid framework structure. This in turn increases the speed of operation of the storage system as the travel time to a nearby charge station is significantly reduced in comparison to travelling to an externally mounted charge station at the edge of the grid framework structure.

The grabber device is sized to descend within a grid space of the grid framework structure and engage with a container located within the grid space. To dock onto the charge station according to the present invention, preferably the electrical charge point is mounted to the grabber device such that the lifting device is configured to raise and lower the electrical charge point relative to the container receiving space so that in a lowered position the electrical charge point is configured to engage with the charge head of the charge station. The charge station of the present invention is sized to fit inside a single grid space or grid cell of the grid framework structure. Mounting the electrical charge point to the grabber device increases the functionality of the grabber device to not only have the ability to pick containers within a given grid space but also have the flexibility to electrically couple with a charge station within the grid framework structure.

Preferably, the grabber device is suspended from the body of the load handling device by a tether that can be extended and retracted from the load handling device to move the grabber device vertically. Optionally, the grabber device is suspended from the body of the load handling device by four tethers. Where the container receiving space is a cavity or recess within the vehicle body, this could be from within the vehicle body or alternatively, where the vehicle body includes a cantilever, the grabber device is suspended from the cantilever of the vehicle body. Preferably, the tether is in the form of a tape or band or a rope. Preferably, the charge receiving pads are electrically coupled to the rechargeable power source by one or more electrical cables having a first end electrically coupled to the recharge power source in the body of the load handling device and a second end electrically coupled to the electrical charge point of the grabber device, more specifically the charge receiving pads. Optionally, the one or more electrical cables is at least partially covered in an electrically insulating sheath. Optionally, the one or more electrical cables can be one or more of the tethers used to suspend the grabber device from the body of the load handling device. Power can be transferred to the load handing device to charge the rechargeable power source via one or more of the tethers suspending the grabber device or alternatively, using a dedicated electrical cable that is separate to the tethers supporting the grabber device. Using at least two of the lifting tethers to carry the current to the rechargeable power source reduces the need to have a dedicated cable to carry the current to the rechargeable power source. However, the present invention is not restricted to transferring power to the rechargeable power source via the lifting tethers and for convenience, separate electrical cables to transfer power to the rechargeable power source falls within the scope of the present invention. Preferably, the grabber device is formed as a frame comprising four corner sections, a top side and a bottom side. More preferably, four gripper elements for engaging with a container are arranged at the bottom side of the frame. Preferably, the grabber device comprises a vertical guide or a locating pin at each corner of the frame to guide the grabber device into engagement with the container. To ensure that the gripper elements of the grabber device properly align with corresponding receiving portions in the rim of the container when engaging with the container, the grabber device comprises at least one vertical guide or locating pin that seats in corresponding cut-outs in the container; typically at each corner of the container. Thus, in order for the grabber device of the present invention to engage with the charge station, the charge station of the present invention mirrors the engagement features of a container, e.g. cut-outs or holes, to help the gripper elements to properly align with corresponding receiving portions in the charge station, more specifically the charge head of the charge station. In addition to alignment of the gripper elements, locating pins help the charge receiving pads to be in registration alignment with the charge providing pads of the charge head when the grabber device of the present invention engages with the charge station.

Preferably, the electrical charge point releasably latches onto the charge head of the charge station. Preferably, the grabber device comprises at least two gripper elements to releasably latch to the charge head of the charge station. Optionally, the electrical charge point comprises the at least two gripper elements. Here, power (current) can be transferred to the rechargeable power source via the least two gripper elements engaging with the charge head of the charge station. Optionally, the electrical charge point may comprise one or more interface pins or charge pads. For example, the electrical charge point is arranged to cooperate with the charge head of the charge station by a plug and socket type configuration. Instead of physically engaging with the charge head of the charger station, the electrical charge point is arranged to cooperate with the charge head by a floating electrical connector. For example, power can be transferred between the electrical charge point and the charge head of the charge station by induction charging. This removes the need to have any physically contact of the charging pads when transferring power to the rechargeable power source.

The present invention provides a charge station comprising a charge head arranged for cooperating with the electrical charge point of the lifting device, more specifically the grabber device of the load handling device of the present invention. Optionally, the charge station comprises a raised platform comprising the charge head. Preferably, the charge head comprises one or more electrical contact surfaces. Preferably, the one or more electrical charge surfaces is an electrical charge providing pad. Preferably, the platform has one or more engagement features, e.g. cut-outs or holes that engage with the gripper elements and/or the locating pins of the grabber device. Preferably, the gripper elements engage with the cut-outs or holes in the platform so as to draw the charge receiving pads of the grabber device with the charge providing pads of the charge head.

Preferably, the charge head is incorporated into a calibration tool for calibrating the lifting device, wherein the platform is raised above a predetermined height above the floor such that there is a predetermined separation between the raised platform and the container receiving portion of the load handling device; preferably a predetermined separation from the lifting device. The calibration tool is used to ensure that the lifting tethers suspending the grabber device descend a fixed depth down a given grid space whilst ensuring that the grabber device is kept horizontal during operation to engage with a container. The grabber device is suspended from a tether that can be extended and retracted from the load handling device to move the grabber device vertically. The depth by which the grabber device descends vertically into a single grid space into engagement with the container is set during manufacture of the load handling device. This depth is dependent on a number of factors such as the number of containers stacked in given grid space. Typically, this depth can be calculated knowing the height of the containers which are of nominally fixed height. Through knowledge of the number of containers in a stack, a controller can determine the depth by which the grabber device must descend to engage with a container in the stack. Thus, depending on the number of containers in a stack, the controller can instruct the grabber device of the load handling device to descend a predetermined depth to engage with a container from a stack in a grid space.

Typically, the grabber device is adapted to engage with the top of the container, e.g. mate with corresponding engagement features in the rim that forms the top surface of the container. Individual containers may be stacked in vertical layers, and their locations in the grid framework structure or "hive" may be indicated using co-ordinates in three dimensions to represent the load handling device or a container's position and a container depth (e.g. container at (X, Y, Z), depth W). Equally, locations in the grid framework structure may be indicated in two dimensions to represent the load handling device or a container's position and a container depth (e.g. container depth (e.g. container at (X, Y), depth Z)). For example, Z=1 identifies the uppermost layer of the grid, i.e. the layer immediately below the rail system, Z=2 is the second layer below the rail system and so on to the lowermost, bottom layer of the grid.

It is essential during a picking operation that the grabber device remains horizontal at all times, particularly when engaging with a storage container, otherwise there is the potential risk that at least one of the tethers holding the grabber device may tear if subjected to unbalanced and high loads. To ensure that the grabber device remains horizontal, is it is important that the length of all of the tethers is kept the same at all times. To obtain the correct length of all of the tethers relative to the grabber device such that the grabber device is kept horizontal during operation, the length of each of the tethers must be adjusted both initially, as well as at various service intervals since they tend to elongate or stretch over time which can be attributed to numerous factors such as environmental, motor wear, stretching of the tether and so on. In an extreme case, the grabber device may fail to engage with the container either because its descent falls too short or overshoots the container. Commonly, the tethers are connected and spooled onto separate reels arranged at an upper level within the housing of the load handling device. To adjust a tether, the corresponding reel may be disconnected from a rotational shaft and the tether adjusted by free rotation of the reel or spool relative the rotational shaft. The reel or spool is subsequently fastened to the rotational shaft when the tether has the desired length. A variant to this method is to provide adjustable lifting tether connectors fixed to the grabber device as taught in WO 2019/206438 (Autostore Technology).

Preferably, at least one of the tethers supporting the grabber device is formed as a tape or band, preferably a metallic tape or band.

The calibration tool is used to ensure that the grabber device of the lifting device descends a fixed depth down a given grid space whilst ensuring that the grabber device is kept horizontal during operation to engage with a container. The raised platform of the calibration tool comprise engagement features that mirror the engagement features of a typical container. To calibrate the lifting device of a load handling device, in particular to ensure that there is no slack in any of the tethers supporting the grabber device, the load handling device is instructed to traverse over a grid space accommodating the calibration tool and descend the grabber device to engage with the engagement features of the calibration tool, i.e. the gripper elements engage with corresponding receiving portions in the calibration tool. Once locked onto the platform, the winch is operated to pull the lifting tethers under tension. When under tension, the spool is adjusted to this new setting. Equally, where the grabber device falls short of the platform, the winch is instructed to wind out the lifting tether until the grabber device engages with the calibration tool, and then the lifting tethers are placed under tension once the grabber device is engaged with the calibration tool.

In a preferred embodiment of the present invention, the charge head for charging the battery of a load handling device can be incorporated into the calibration tool for calibrating the lifting device of the load handling device. Preferably, the calibration tool comprises the charge head arranged to electrically couple with the electrical charge point of the lifting device. Preferably, the charge head of the charge station comprises one or more contact surfaces or charge providing pads for electrically coupling with the charge point of the lifting device; more preferably the charge surfaces are mounted to the platform of the calibration tool. By incorporating the charge station into the calibration tool, calibration of the lifting device and charging of the battery can happen in situ during a calibration operation, thereby improving the efficiency of operation of the storage system which in turn removes the need to treat both processes of calibration of the lifting tethers and charging of the battery separately.

The present invention also provides a storage system comprising:

a first set of parallel pathways and a second set of parallel pathways running transversely to the first set in a substantially horizontal plane to form a grid pattern comprising a plurality of grid spaces;

a plurality of stack of containers located beneath the first set and second set of parallel pathways, wherein each of the stack of containers occupies a single grid space, a load handling device of the present invention arranged to traverse along the first set and second set of parallel pathways over the plurality of grid spaces such that when positioned above a stack of containers occupying a grid space, the lifting device is configured to lift at least one container from said stack of containers, characterised in that;

at least one of the grid spaces comprises a charge station according to the present invention.

Preferably, the load handling device is operatively arranged to traverse over a grid space occupying a charge station and charge the rechargeable power source in the load handling device by engaging the grabber device with the charge station. Optionally, the first set of parallel pathways comprises a first set of parallel rails or tracks and the second set of parallel pathways comprises a second set of parallel rails or tracks. The pathway includes but is not limited to rails or tracks.

Preferably, the grabber device is configured to engage with and/or disengage from the charge station in response to a signal from a controller. Preferably, the controller actuates an actuator to engage with and/or disengage from the grabber device from the charge station. More preferably, the signal represents a condition of the rechargeable power source, whereby the condition is any one of voltage, and/or current, and/or temperature, and/or state of charge and/or depth of discharge. Actuation of the grabber device to engage with and disengage from the charge head of the charge station is in response to a condition of the rechargeable power source, whereby the condition is any one of voltage, and/or current, and/or temperature, and/or state of charge and/or depth of discharge. For example, the controller actuates the grabber device to disengage from the charge head in response to the controller sensing that the rechargeable power source has reached a predetermined depth of charge.

The present invention provides a method for charging a rechargeable power source in a load handling device of the present invention, comprising the steps of:

i) moving the load handling device over a grid space occupying a charge station of the present invention;
  ii) lowering the grabber device to engage with the charge station such that an electrical contact is established between the charge point of the grabber device and the charge head of the charge station;
  iii) transferring power from the charge station to the rechargeable power source.

Preferably, the method further comprises the steps of:

iv) determining a condition of the rechargeable power source, wherein the condition is any one of voltage, and/or current, and/or temperature, and/or state of charge and/or depth of discharge,
  v) dis-engaging the grabber device from the charge station so as to disconnect the electrical charge point from the charge head when the rechargeable power source reaches a predetermined condition;
  vi) raising the grabber device up to the vehicle body of the load handling device.

BRIEF DESCRIPTION OF THE DRAWINGS

Further features and aspects of the present invention will be apparent from the following detailed description of an illustrative embodiment made with reference to the drawings, in which.

DETAILED DESCRIPTION

Figure 8:
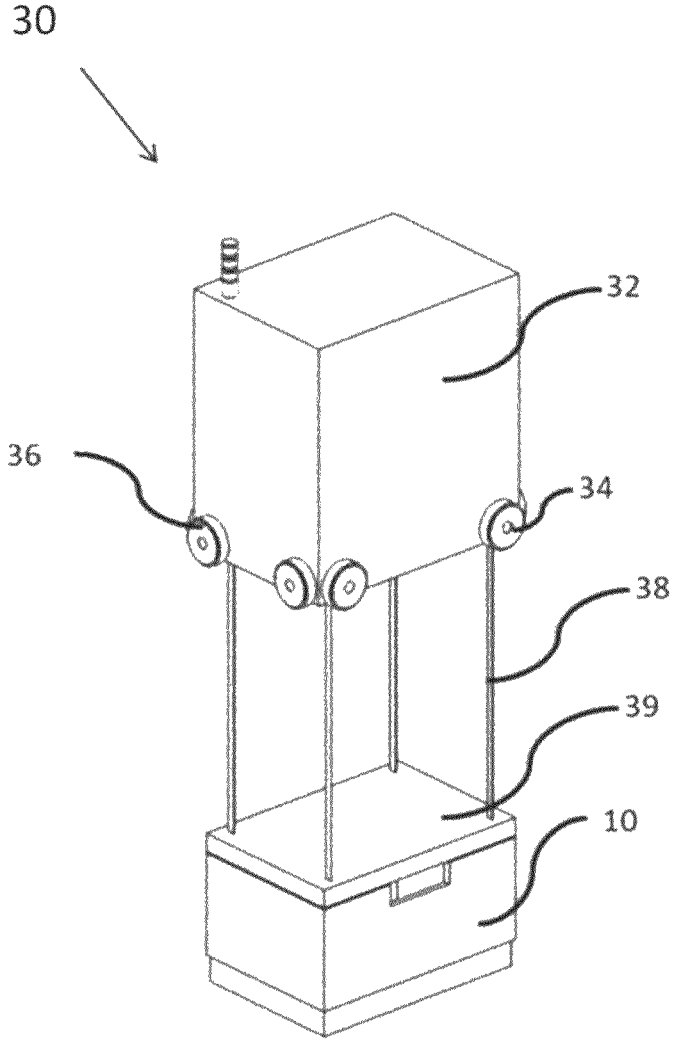
FIG. 8 is a schematic perspective view of the load handling device showing the lifting device gripping a container from above.
Figures 9A, 9B:
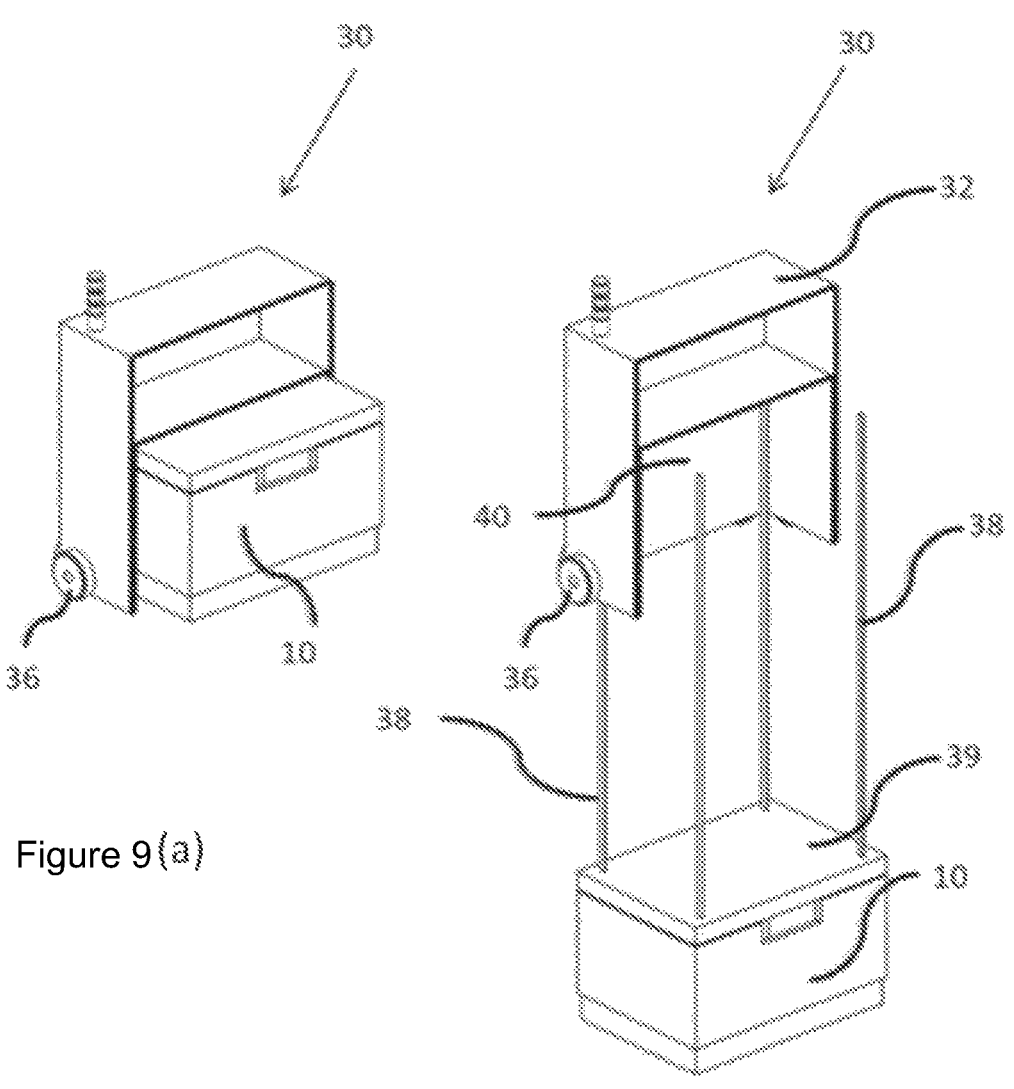
FIGS. 9(a) and 9(b) are schematic perspective cut away views of the load handling device of FIG. 8 showing (a) the container receiving space of the load handling device and (b) a container accommodating the container receiving space of the load handling device.

FIG. 8 shows a load handling device 30 according to an embodiment of the present invention and described in International patent application WO 2015/140216 (Ocado Innovation Limited), the contents of which are incorporated herein by reference. The load handling device comprises a vehicle body 32 equipped with a lifting mechanism (not shown) comprising a winch or a crane mechanism to lift a storage container or bin 10, also known as a tote, from above. The crane mechanism comprises a winch cable 38 wound on a spool or reel and a grabber device 39. The grabber device 39 is configured to grip the top of the container 10 to lift it from a stack of containers in a storage system of the type shown in FIGS. 1 and 2. Typically, the grabber device 39 is configured as a frame and four lifting tethers 38 are fixed to each corner of the grabber device 39 (see FIG. 9b). Further details of the grabber device are discussed below.

The vehicle body 32 comprises an upper part and a lower part (see FIG. 9). The lower part is fitted with two sets of wheels 34, 36, which run on rails at the top of the grid framework structure of the storage system. Each of the set wheels are driven to enable movement of the vehicle in X and Y directions respectively along the rails. One or both sets of wheels can be moved vertically to lift each set of wheels clear of the respective rails, thereby allowing the vehicle to move in the desired direction.

The wheels are arranged around the periphery of a cavity or recess, known as a container-receiving space 40, in the lower part. The recess 40 is sized to accommodate the container 10 when it is lifted by the crane mechanism, as shown in FIG. 9 (a and b). When in the recess, the container is lifted clear of the rails beneath, so that the load handling device can move laterally to a different location. On reaching the target location, for example another stack, an access point in the storage system or a conveyor belt, the bin or container can be lowered from the container receiving portion and released from the grabber device 39.

Figure 10:
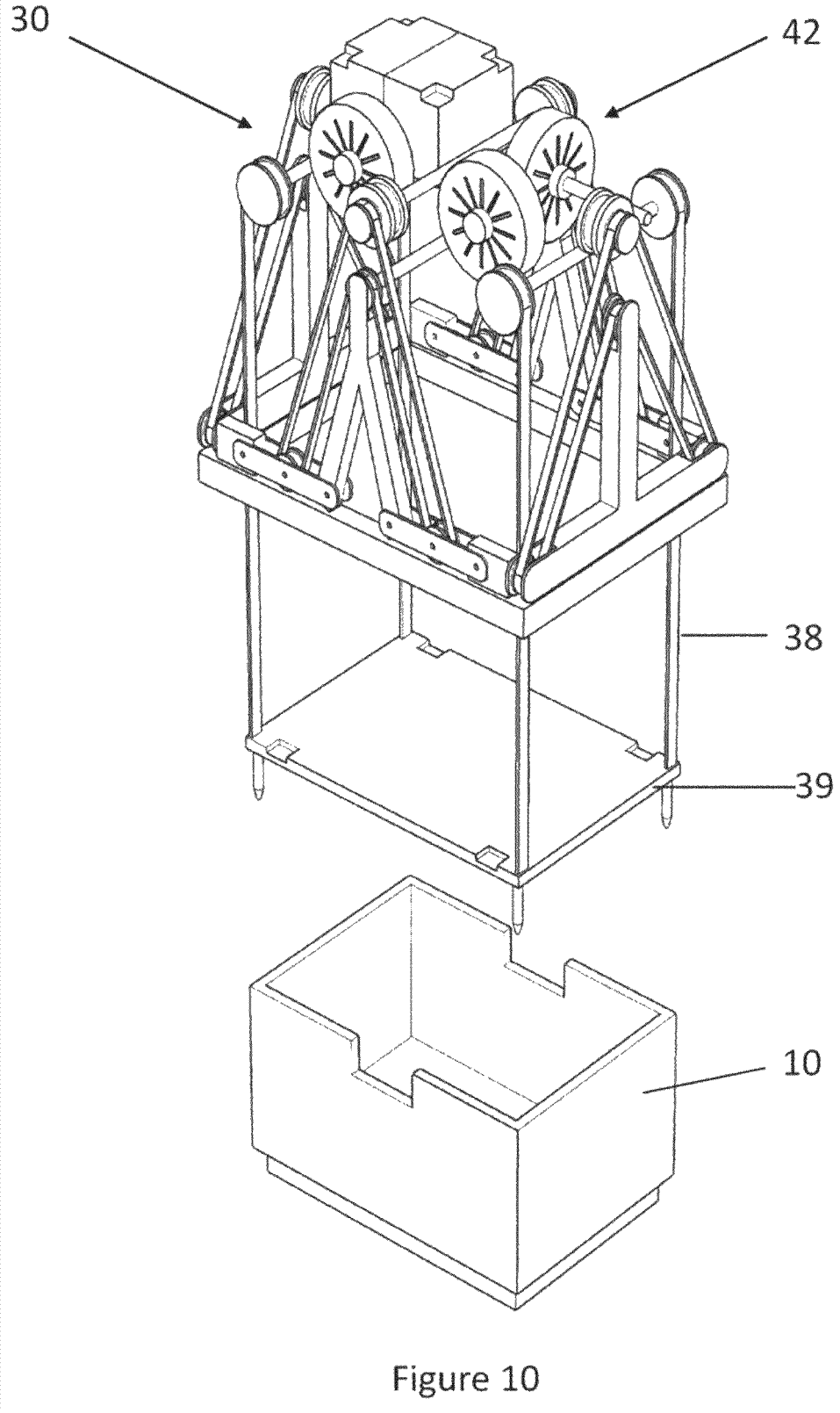
FIG. 10 is a schematic perspective view of the drive mechanism of the load handling device for driving a lifting device and/or drive wheels according to an embodiment of the present invention.

The upper part of the vehicle body 32 may house a majority of the bulky components of the load handling device. Optionally, the vehicle body houses the rechargeable power source. FIG. 10 shows a perspective view of the load handling device with the outer casing housing the bulky components removed. Typically, the upper part of the vehicle houses a driving mechanism 42 for driving both the wheels and the lifting mechanism together with an on-board rechargeable power source for providing the power to the driving mechanism and the lifting mechanism. The rechargeable power source can be any appropriate battery, such as, but not limited to, lithium batteries or even a capacitor. For the purpose of explanation of the present invention, the rechargeable power source is a battery. It is perfectly feasible in the present invention that any of the bulky components such as the rechargeable power source to be located anywhere in the body of the vehicle 32, e.g. in the lower part of the vehicle to lower the centre of gravity of the load handling device 30 and thereby improve the stability of the load handling device. To provide a container receiving space within the body of the load handling device, preferably the rechargeable energy source is integrated into one of the side walls of the body of the vehicle 32.

Whilst the container receiving space 40 for accommodating a container when it is lifted by the crane mechanism is arranged within the vehicle body 32 shown in FIG. 9, the present invention is not limited to the container receive space 40 being located within the vehicle body 32. The present invention is also applicable to the container receiving space being located below a cantilever such as in the case where the vehicle body of the load handling device has a cantilever construction as described in WO2019/238702 (Autostore Technology AS). For the purpose of the invention, the term 'vehicle body" is construed to optionally cover a cantilever such that the grabber device is located below the cantilever. However, for ease of explanation of the present invention, the container receiving space for receiving a container is arranged within a cavity or recess within the vehicle body.

The driving mechanism 42 typically comprises three main sets of motors: Z-drive motors used to raise and lower winch tethers, which are wound onto spools mounted on drive shafts; an X-drive motors which drives a first set of wheels and a Y-motors which drives a second set of wheels. However, the number of motors to drive the first and second sets of wheels and the lifting mechanism is not limited to three sets of motors and the number of motors is dependent on the availability of space within the vehicle body and the complexity of the drive mechanism to drive both the wheels and the winch mechanism. For example, each of the first and second sets of wheels can by driven by individual hub motors in the lower part of the vehicle to provide four wheel drive capability of the load handling device on the grid framework structure. This is to allow the load handling device to able to travel along the rails or tracks on the grid framework structure should anyone of the wheels in the set slip on the rail or track. Equally, each of the lifting tethers 38 can be operated by separate motors. For example, in the particular embodiment of the present invention shown in FIG. 14, four lifting tethers 38 are shown, each of the four lifting tether 38 at each corner of the grabber device 139 and whereby four separate motors are used to wind the four lifting tethers on separate spools. Whilst the particular embodiment of the present invention describes the load handling device travelling along rails or tracks, the load handling device can travel along any pathway on the grid framework structure and is not limited to travelling on rails or tracks. The pathway can be any surface including but not limited to rails or tracks.

The lifting mechanism used to lift the containers into the container receiver portion can take any suitable form. For maximum stability and load capacity, commonly four lifting tethers 38 are used to winch the grabber device 39, with one tether disposed nearby or at each of the corners of the grabber device 39, but a different arrangement, for example with fewer tethers, could be used if desired. One end, e.g. first end, of each of the tethers is wound on the spool in the load handling device and the other end, e.g. second end, is fixed to the grabber device 39, typically at each corner of the grabber device, by a suitable bracket (not shown). The number of tethers attached to the grabber device is dependent on the ability to maintain the grabber device horizontal during operation when picking up a container 10 and the ability to withstand the tension applied to the tethers when lifting containers, which could weigh up to 40 kg, without extending or stretching, i.e. be inextensible under a predetermined applied tensile stress. To possess the necessary physical properties (Young's Modulus), the tethers are generally in the form of a cable, e.g. rope or even a tape, but other tethers with the necessary physical properties to winch containers are permissible in the present invention. In addition to having the necessary elastic modulus, two of the tethers can be made electrically conductive to transfer power from the charge station via the grabber device to the battery in the vehicle body 32 of the load handling device 30 according to the present invention, i.e. one of the tethers providing DC- and the other tether providing DC+. Preferably, the tethers are metallic. In addition to being able to conduct electricity, the tethers should be resistant to corrosion. Commonly, the tethers are composed of stainless steel but other metallic materials with the above properties are permissible in the present invention. Two of the tethers that are selected to conduct electricity to charge the battery is electrically insulated in an electrically insulating sheath, e.g. a thermoplastic sheath or other suitable polymer material. Whilst other types of tether material with the necessary physical and electrical properties are permissible in the present invention, for the purpose of explanation of the present invention and what is commonly used in practice, the tethers are in the form of a tape or band and composed of stainless steel. Having the tethers in the form of a tape allows the tether to be compactly wound onto the spool or reel of the winch in the body 32 of the load handling device 30 whilst providing the necessary cross-sectional area to carry large currents which can be in the order of 160 amps.

Figure 11:
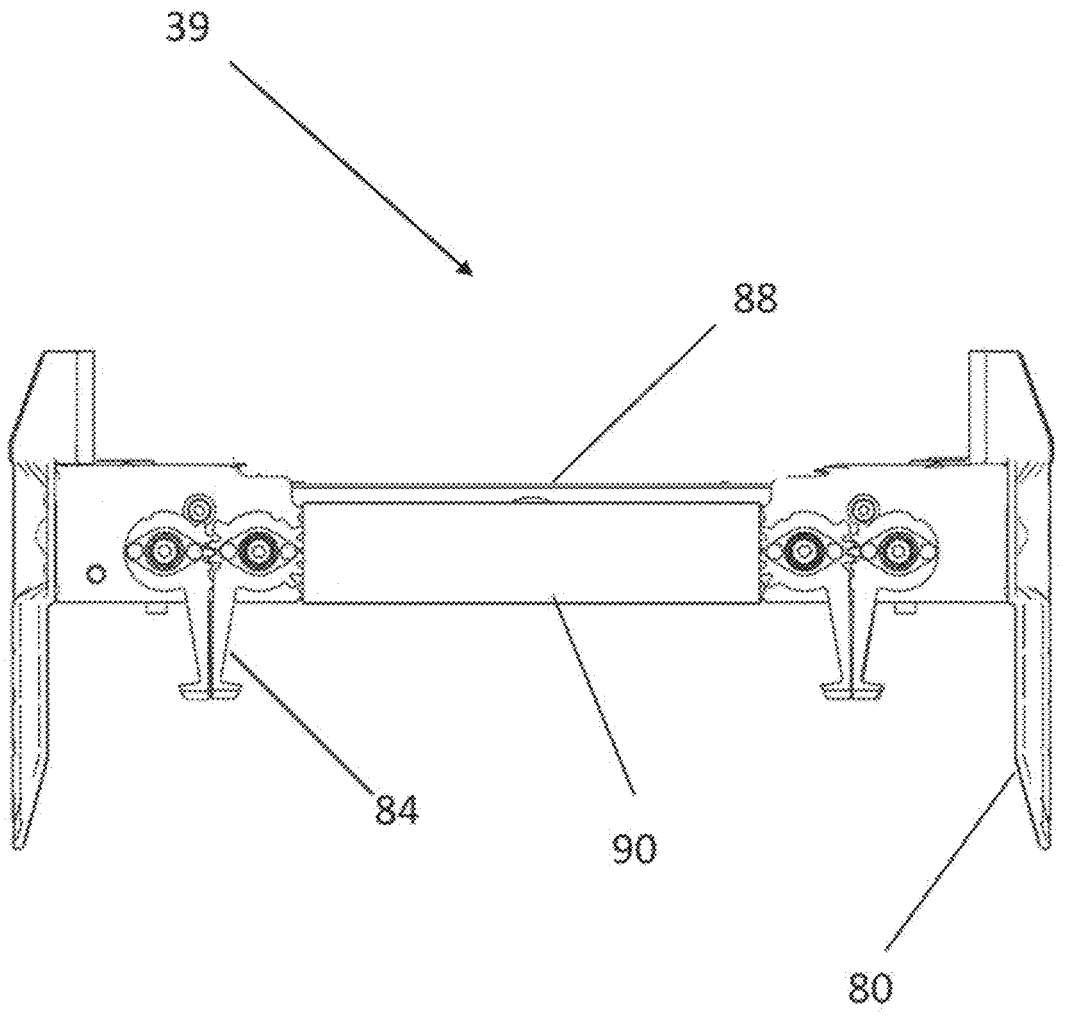
FIG. 11 is a schematic perspective view of a side view of the grabber device of the lifting device according to an embodiment of the present invention.

As discussed above, connected to the ends of the tethers 38 is the grabber device 39 as shown in FIG. 11. In the particular embodiment shown in FIG. 11, the grabber device 39 is formed as a frame having four corner sections, a top side 88 and a bottom side 90. To grab a container 10, the grabber device 39 comprises four locating pins or guide pins 80 nearby or at each corner of the grabber device 39 which mate with corresponding cut outs or holes 82 formed at four corners of the container 10 and four gripper elements 84 arranged at the bottom side of the grabber device 39 to engage with the rim of the container (see FIG. 12). The locating pins 80 help to properly align the gripper elements 84 with corresponding holes in the rim of the container.

Figure 12:
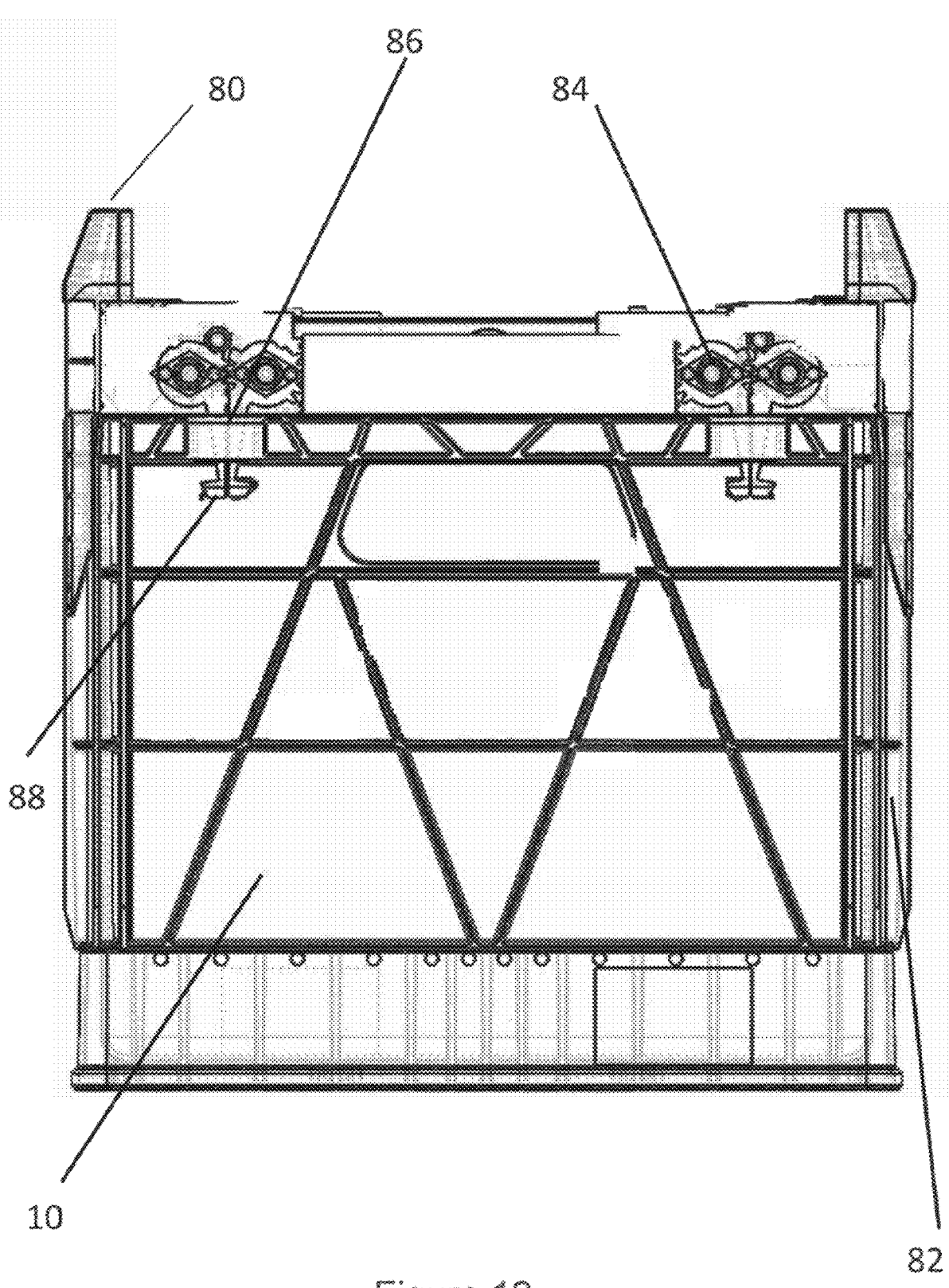
FIG. 12 is a schematic perspective view showing the stage of engagement of the grabber device with a container according to an embodiment of the present invention.

In the particular embodiment shown in FIG. 11, each of the gripper elements 84 comprises a pair of wings that are collapsible to be receivable in corresponding holes 86 in the rim of the container and an open enlarged configuration having a size greater than the holes 86 in the rim of the container in at least one dimension so as to lock onto the container (see FIG. 12). The wings are driven into the open configuration by a drive gear. More specifically, the head of at least one of the wings comprises a plurality of teeth that mesh with the drive gear such that when the gripper elements 84 are actuated, rotation of the drive gear causes the pair of wings to rotate from a collapsed configuration (FIG. 12) to an open enlarged configuration (FIG. 12).

When in the collapsed or closed configuration, the gripper elements 84 are sized to be receivable in corresponding holes 86 in the rim of the container as shown in FIG. 12. The foot of each of the pair of wings comprises a stop 88, e.g. a boss, such that when received in a corresponding hole 86 in the rim of the container, the stop engages with an underside of the rim when in an enlarged open configuration to lock onto the container when the grabber device 39 winched upwards towards the container-receiving portion of the load handling device.

The gripper elements 84 are received in the holes in the rim of the container when the grabber device 39 is at a predetermined height above the rim of the container as measured by one or more depth sensors (not shown) mounted to the underside of the grabber device. At this depth, the gripper elements 84 are actuated to grab the container 10 in response from a signal from the one or more of the depth sensors mounted to the underside of the grabber device 39. The predetermined height is determined through calibration of the grabber device either with a container of known height or a calibration tool (see FIG. 17) having a raised platform that is representative of the height of a container. Further detail of the calibration is discussed below. When the grabber device is at the predetermined height above the container as measured by the depth sensor, which is an indication that the gripper elements are received within the holes in the rim of the container as shown in FIG. 12, a controller sends a signal to the drive gear to actuate the gripper elements 84 to the enlarged open configuration, i.e. having a size larger than the holes in at least one dimension, in order to grab the container. Various types of depth sensors commonly known in the art for measuring depth or height are permissible in the present invention. Examples of depth sensors include but are not limited to light sensors, camera sensors, ultrasonic sensors, plunger etc. Equally and/or additionally the gripper elements 84 can be actuated by determining the number of rotations of the spool or reel carrying the lifting tape (lifting tether) such that when the rotation of the spool reaches a predetermined rotation necessary for the gripper elements 84 to engage with the holes

86 in the rim of the container, the gripper elements 84 are actuated to grip the container from above.

According to an embodiment of the present invention, power is transferred from the grabber device 39 to the battery situated in the load handling device 30 via two of the lifting bands 38 holding the grabber device 39, i.e. one providing DC- and the other providing DC+. As discussed above, two of the lifting bands 38 can be made electrically conductive to transfer power from the charge station to the battery held in the load handling device via the grabber device 39. Electrical connection between the grabber device 39 and the lifting band 38 can be made by one or more electrical terminal blocks located within the grabber device.

The charge station is connected to a suitable power source charger, preferably a DC power source charger. Whilst it is convenient to utilise two of the lifting bands 38 to transfer power to the battery, power can be transferred to the battery by two dedicated electrical cables that extend from the grabber device to electrically couple with the battery in the body of the load handling device. The grabber device can comprise at least two charge contacts or charge receiving elements (or collectors) having current conducting surfaces on its underside to electrically couple with at least two charge pads or charge providing elements having corresponding current conducting surface on the top surface of a charge station (see FIGS. 13 and 14).

Figure 13:
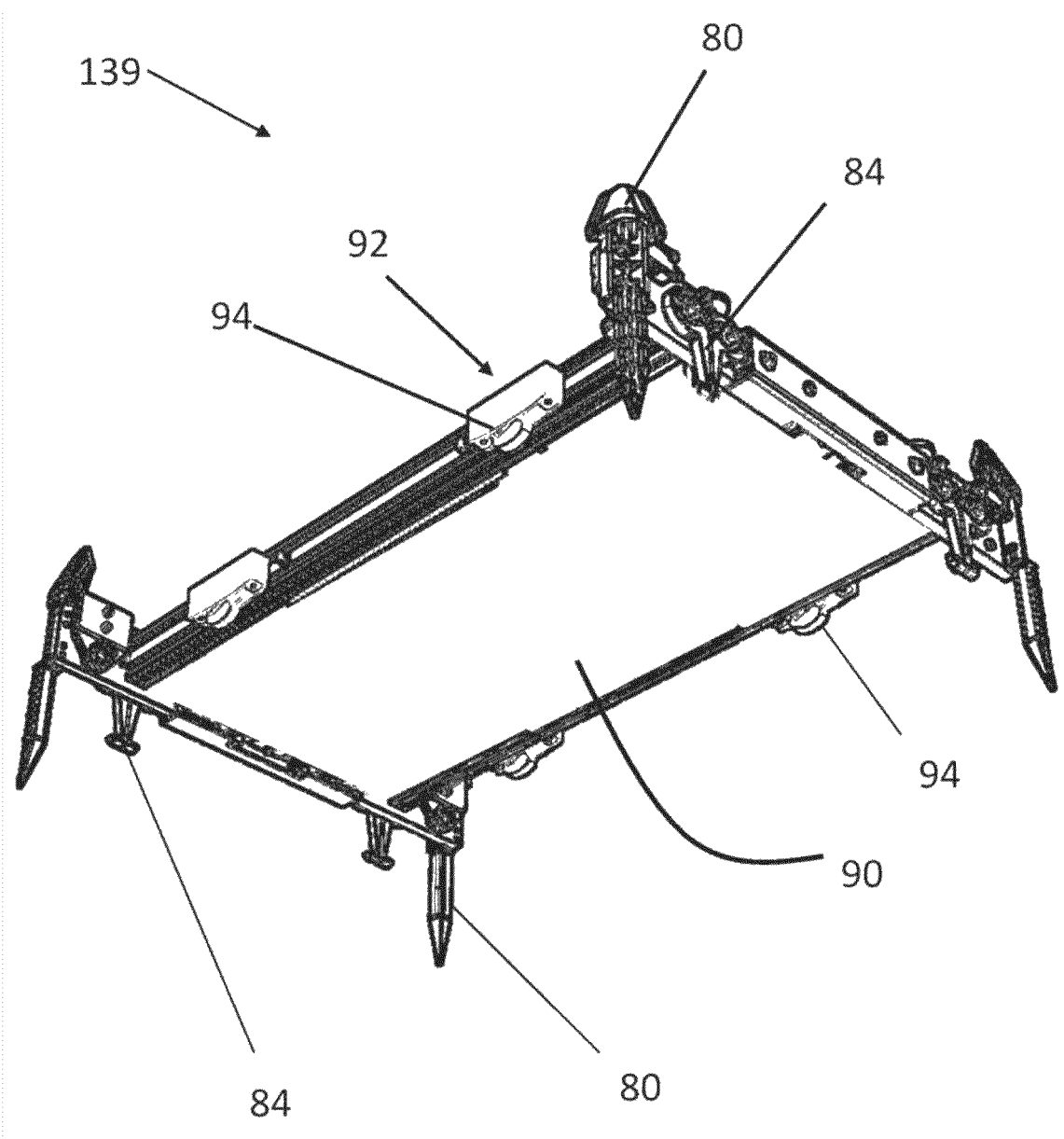
FIG. 13 is a schematic perspective view of the grabber device showing the charging contacts according to an embodiment of the present invention.

FIG. 13 shows a perspective view of the grabber device 139 according to an embodiment of the present invention. All of the features of the grabber device commonly present in a known grabber device discussed above to lift a container from a stack such as the locating pins 84 and the gripper elements 84 are present in the grabber device 139 of the present invention. In addition to the gripper elements 84 for engaging with the rim of the container, the grabber device 39 further comprises an electrical charge point 92 in the form of two or more charge receiving pads 94 arranged to cooperate with a charge head of a charge station in the form of two or more charge providing pads (not shown). The charge receiving pads 94 and/or the charge providing pads are resilient biased in a vertical direction towards each other to increase the contact force between the corresponding contact surfaces of the charge head of the charge station. The charge receiving pads 94 are mounted to the bottom side 90 of the grabber device 139 so as to electrically couple with the charge providing pads of the charge station when the contacts surfaces of the contact pads come together. Further detail of the charge station according to an embodiment of the present invention is discussed further below.

Instead of the provision of separate charge receiving pads mounted to the grabber device 139, equally or additionally, at least two of the gripper elements 84 itself can be used to electrically couple to the charge station when the grabber device 139 engages with the charge station, i.e. the gripper elements 139 comprises the electrical charge point 92. For example, the gripper elements 84 can engage with corresponding charge providing elements of the charge station. The gripper elements 84 can be made electrically conductive to at least two lifting tethers by suitable wiring so as to transfer power from the charge station to the battery via the gripper elements 84. Two of the lifting tethers used to carry current to the battery can be made electrically insulating by an electrically insulating sheath. Equally, power can be transferred to the battery via the gripper elements 84 by at least two dedicated electrical cabling.

In the particular embodiment of the present invention, two charge point or charge receiving pads are shown on the underside of the grabber device 139 that electrically couple with two contact pads or charge providing pads on the top surface of the charge station. Two of the charge points or charge receiving pads on the grabber device 139 are electrically contactable to two charge pads or charge providing pads of the charge station. As the charge providing pads of the charge station provide a direct current, one of the charge providing pad is DC- and the other charging providing pad is DC+. Although FIG. 13 shows four charge points 92, electrical coupling between the grabber device 139 and the charge station can be provided by any number of charge points in any arrangement.

The charge point 94 or charge receiving pad 94 may be in the form of a charge contact and may be sprung based so as to lessen the impact of the power transfer unit making contact with a charge providing pad on the top surface of the charge station. Two or more of the charge receiving pads 94 electrically couple to two or more of the lifting bands 38 supporting the grabber device 139, e.g. use of a bracket comprising a terminal block. In an alternative embodiment of the present invention, two or more dedicated electrical cables can electrically couple the charge receiving pads 94 of the grabber device 139 to the battery in the body of the load handling device 30 instead of the use of the lifting tethers 38. Additional charge contacts on the grabber device can be present to electrically couple with two other charge providing pads on the charge station to suppress arcing between the contact surfaces between the grabber device and the charge station.

The motors used to drive the wheels and the lifting drive assembly are commonly based on DC (direct current) motors, mainly because they are easier and cheaper to control than AC motors and have higher starting torque and have a quick starting and stopping ability. However, as a result of powering the motors by DC, switches used to connect the motors to a DC power source which can carry a current in the region of 160 amps are susceptible to arcing. To mitigate excessive arcing between the contact surfaces of the charging receiving pads and the charge providing pads on the top surface of the charge station, additional charge contacts may be present to establish that an initial electrical connection has been made with the charge head of the charge station before full flow of around 160 amps to charge the battery is transferred through the contact pads. An initial low current level having a limit below which any extensive arcing does not occur is supplied to the additional charge receiving pads 94 of the grabber device 139. Once electrical connection is established and an adequate contact pressure is established between the contact pads (charge receiving pads and charge providing pads), large currents can then be allowed to flow through the charge providing pads. Various other arc suppressing devices commonly known in the art including but are not limited to solid state relays, capacitors, snubbers etc., are permissible in the present invention.

Figure 14:
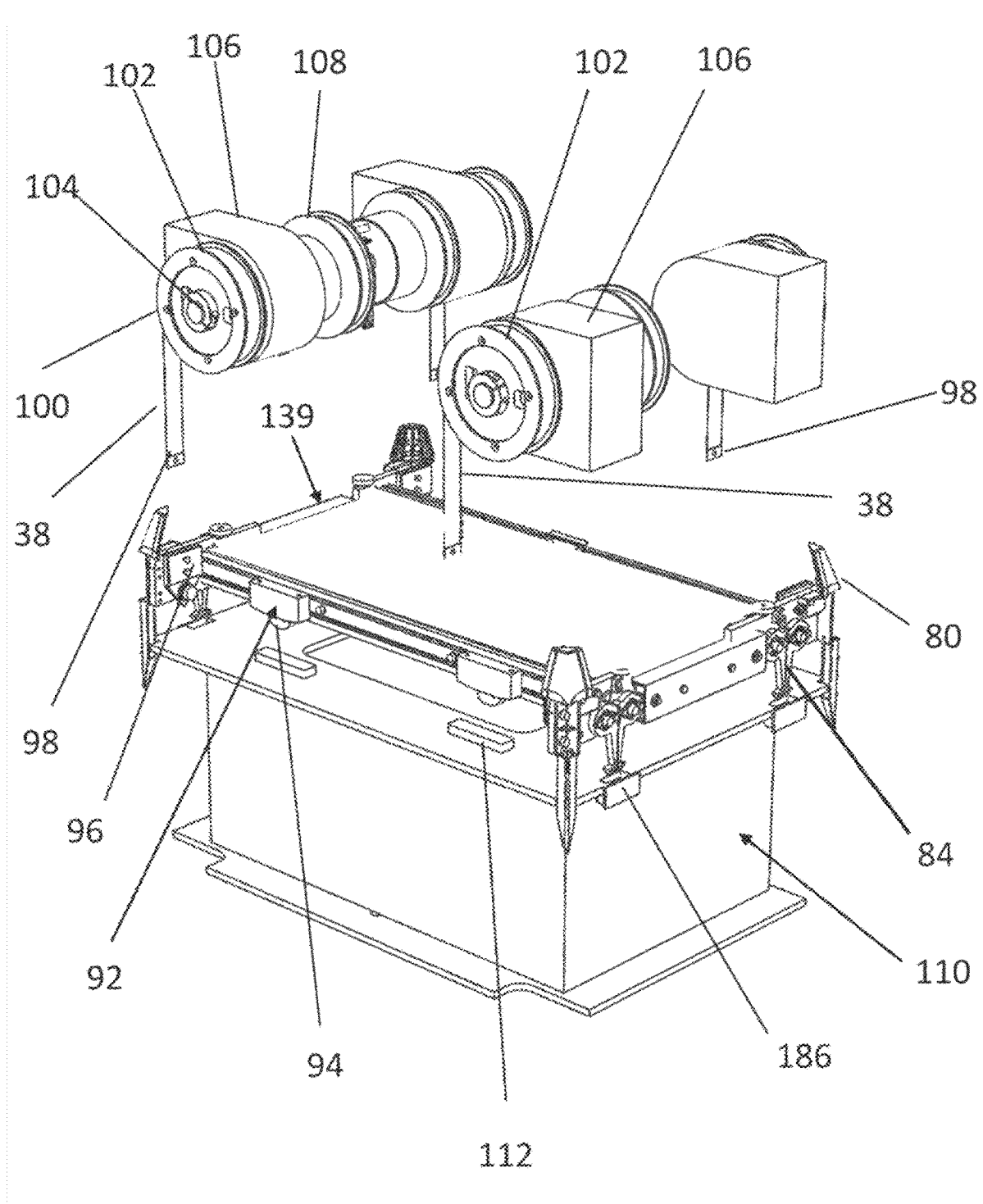
FIG. 14 is a schematic perspective view of the load handling device and charging station showing the winch assembly of the load handling device according to an embodiment of the present invention.

A bracket 96 comprising one or more electrical terminal blocks can be used to connect the end 98, e.g. second end, of the lifting tether or band 38 to the grabber device 139 (see FIG. 14), e.g. via a set of wires. The first end 100 of the lifting tether 38 is wound on a spool or reel 102 mounted on drive shafts 104 in the body of the load handling device and driven by one or more motors 106. One or more of the brackets 96 used for fixing the grabber device 139 to the lifting tether 38 may be used to electrically couple the charge point 92 to the battery via a set of wires or alternatively, if a dedicated electrical cable is used to transfer power to the battery, a separate bracket (not shown) can be used to electrically couple two or more dedicated electrical cables to the battery (one wire providing DC- and the other wire providing DC+). The bracket is made electrically insulating to electrically isolate the bracket from the other components of the grabber device 139. As shown in FIG. 14, the bracket may comprise one or more electrically insulating terminal blocks to electrically couple the charge contacts or the charge receiving elements with at least two of the lifting tethers or dedicated electrical cables for charging the battery.

The spool or reel 102 carrying the electrical cable or band, be it two or more of the lifting tethers 38 or a dedicated electrical cable, are provided with two or more electrical contacts to transfer power from the charge station to the battery via the spool or reel. In the particular example shown in FIG. 14, the reel or spool 102 carrying the electrical cable or lifting tether 38 comprises a slip ring 108 for electrically coupling to two or more conducting brushes. Slip rings 108 are often made of electrically conductive materials, such as copper and fitted to the shaft 104 of the drive motor 106 with connective wiring going into the motors from them. The component which transmits the energy to the slip ring is called a 'brush' and commonly made with a mixture of carbon and copper and constantly touches the slip-rings, hence the name 'brush' as they constantly brush against the slip-rings. This constant touch conveys the current along the two or more of the lifting tethers 38 to charge the battery. Other cord reel technology commonly known in the art to electrically couple the battery to the electrical cable or lifting tether, be it the lifting tether or dedicated electrical cable, wound on the spool or wheel are permissible in the present invention.

In an alternative embodiment of the present invention, electrical connection between the battery and the electrical cable, be it the lifting tether or a dedicated electrical cable, can use a pantograph type mechanism (not shown) comprising an electrical contact strip or shoe to electrically contact the electrical cable or lifting tether 38 whenever the battery is being charged. The pantograph may be spring-loaded and pushes a contact shoe up against the electrical cable to transfer current from the electrical cable or lifting tether to the battery. A sensor such as a depth sensor (not shown) may be used by the controller to instruct the pantograph to engage with the electrical cable. Various arc suppressing devices commonly known in the art including but are not limited to solid state relays, capacitors, snubbers etc., can be used to prevent arcing between the contact shoe and the lifting tether or electrical cable. Once the battery is charged as determined by a control, electrical connection to the battery is removed by disengaging the electrical contact between bush and the slip ring or between the shoe of the pantograph and the electrical cable. As discussed above, one or more additional contact pads can be mounted to the charge station that is arranged to electrically couple with one or more contact pad mounted to the charge station. In the particular embodiment shown in FIG. 14, the charge station 110 comprises four contacts pads 112; two of which are used to transfer power to the battery and the other two can be used to send signals to and from the grabber device 139, i.e. check the status of the battery. A control system will, thus, ensure that the charge providing pads supply the required current based on the condition of the rechargeable battery. The condition may be based on at least one of voltage, temperature, state of charge, depth of discharge, and current, i.e. whether fully charged.

The charge receiving pads 94 mounted to the grabber device 139 electrically couple with the contact providing pads of a charge station 110 as the grabber device 139 is drawn towards the charge station 110. In the particular example of the present invention shown in FIGS. 14 to 17, the charge station 110 comprises corresponding locking features 186 that mirror the locking features 86 in the container, discussed above, for engaging with the gripper elements 84 mounted to the underside of the grabber device 139. To properly align the gripper elements 84 with the corresponding locking features 186 in the charge head of the charge station 110, as with the engagement features of a container discussed above, the charge station 110 further comprises cut-outs or holes 182 (see FIG. 15) that are receivable by at least one locating pin 80 of the grabber device 139. The locating pins 80 also help to align the charge providing pads 112 of the charge head into contact with the charge receiving pads of the grabber device 139.

FIG. 14 shows an example of the present invention where the grabber device 39 engages with the charge station 110 of the present invention. The charge contacts or the charge receiving pads 94 are drawn towards the charge providing pads 112 of the charge station 110 with sufficient force or pressure to minimise the electrical contact resistance between their corresponding contact surfaces. Each or both of the charge contacts and the contact pads 94, 112 can be resiliently biased in a vertical direction towards each other to increase the contact force between their corresponding contact surfaces.

Figure 15:
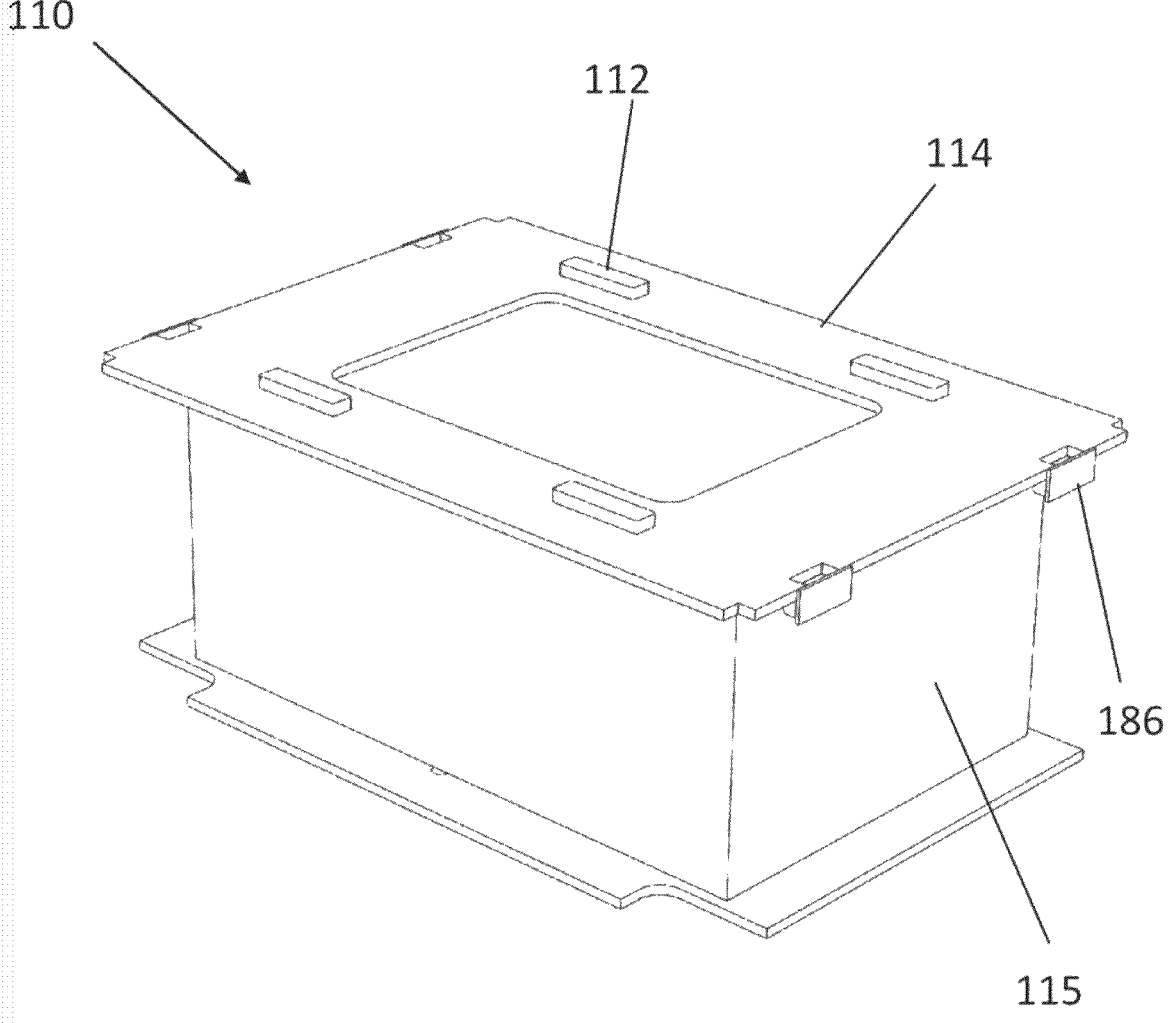
FIG. 15 is a schematic perspective view of a calibration tool adapted as a charge station for charging a battery in the load handling device according to an embodiment of the present invention.

In a particular embodiment of the present invention, the corresponding locking features 186 of the charge station 110 comprise holes or apertures for receiving the gripper elements 84 of the grabber device 139. As shown in FIG. 15, the charge station 110 comprises a raised platform 114 having corresponding locking features 186 to engage with the gripper elements 84 mounted to the underside of the grabber device 139. In addition to the locking features 186, the top surface of the platform 114 comprises a charge head comprising two or more contact providing pads 112 that electrically couple with the charge receiving pads 94 of the grabber device 139. Electrical connection between the charge head of the charge station 110 and the grabber device 139 can be via a plug and socket type connection, e.g. plug-in systems from Staubli® or a floating type connection. With floating type connection, power is transferred by induction power transfer and therefore, does not require any physical contact between the charge pads of the grabber device 139 and the charge head (charge providing pads) of the charge station 110. Equally but not exclusively the gripper elements 84 mounted to the grabber device 139 can be used to transfer power from the charge station 110 to the battery via a suitable electrical cable. The charge head comprising the charge providing pads 112 of the charge station 110 may have suitable electrical contacts to electrically engage with the gripper elements 84. Auxiliary components of the charge station 110 such as the rectifier can be mounted to the charge station 110, e.g. mounted to the underside of the raised platform 114.

Figure 1:
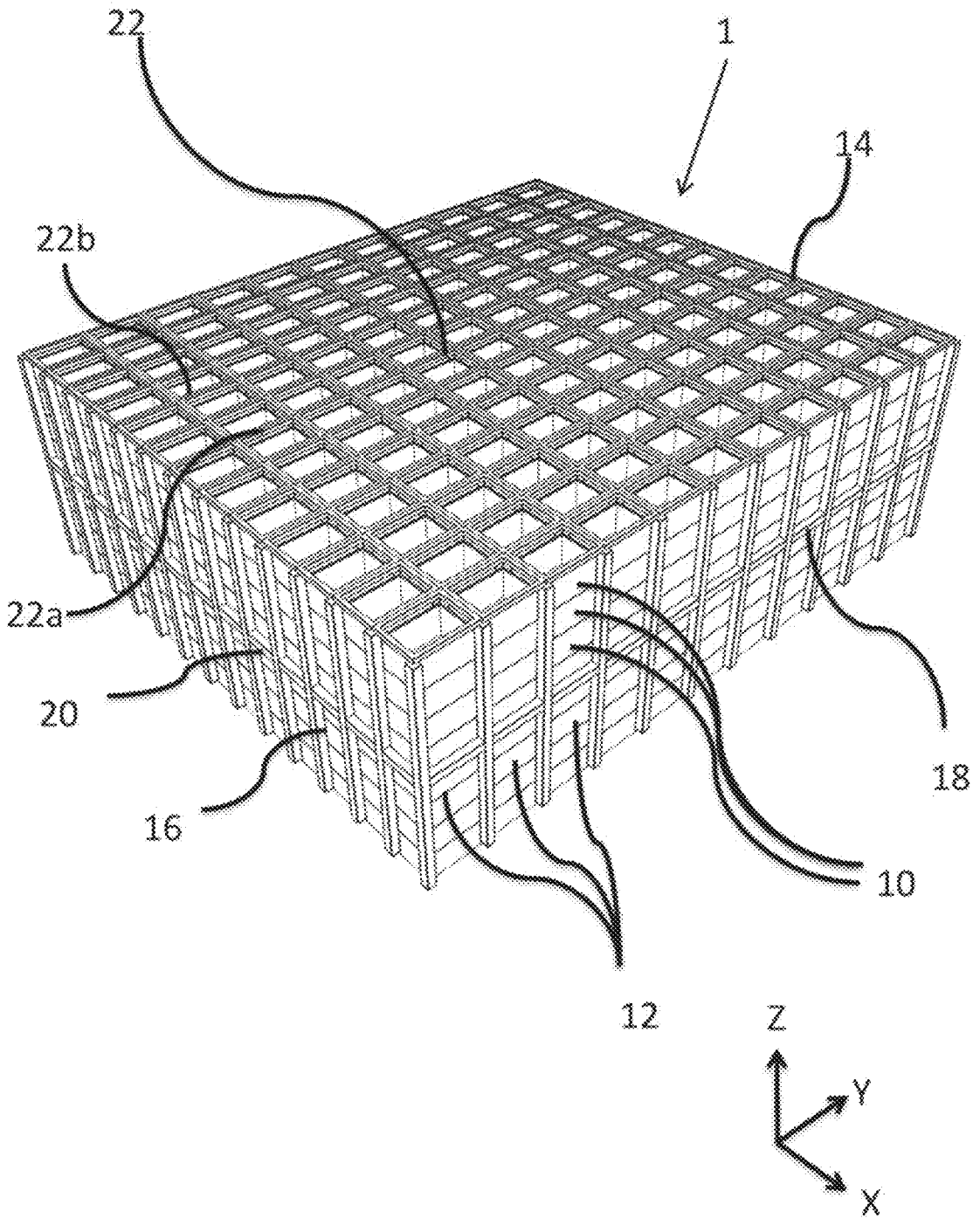
FIG. 1 is a schematic diagram of a grid framework structure according to a known system.
Figure 2:
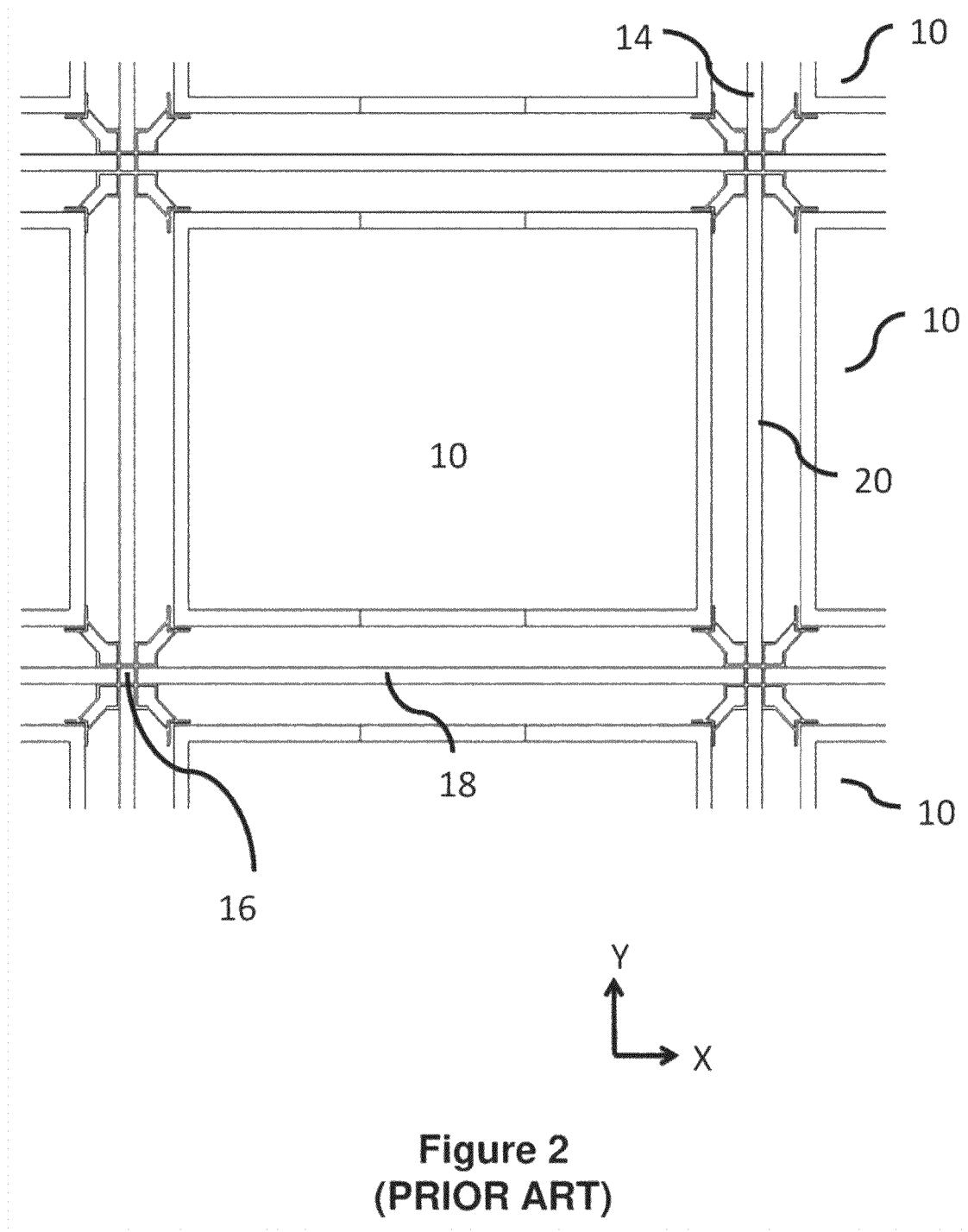
FIG. 2 is a schematic diagram of a top down view showing a stack of bins arranged within the grid framework structure of FIG. 1.
Figure 3:
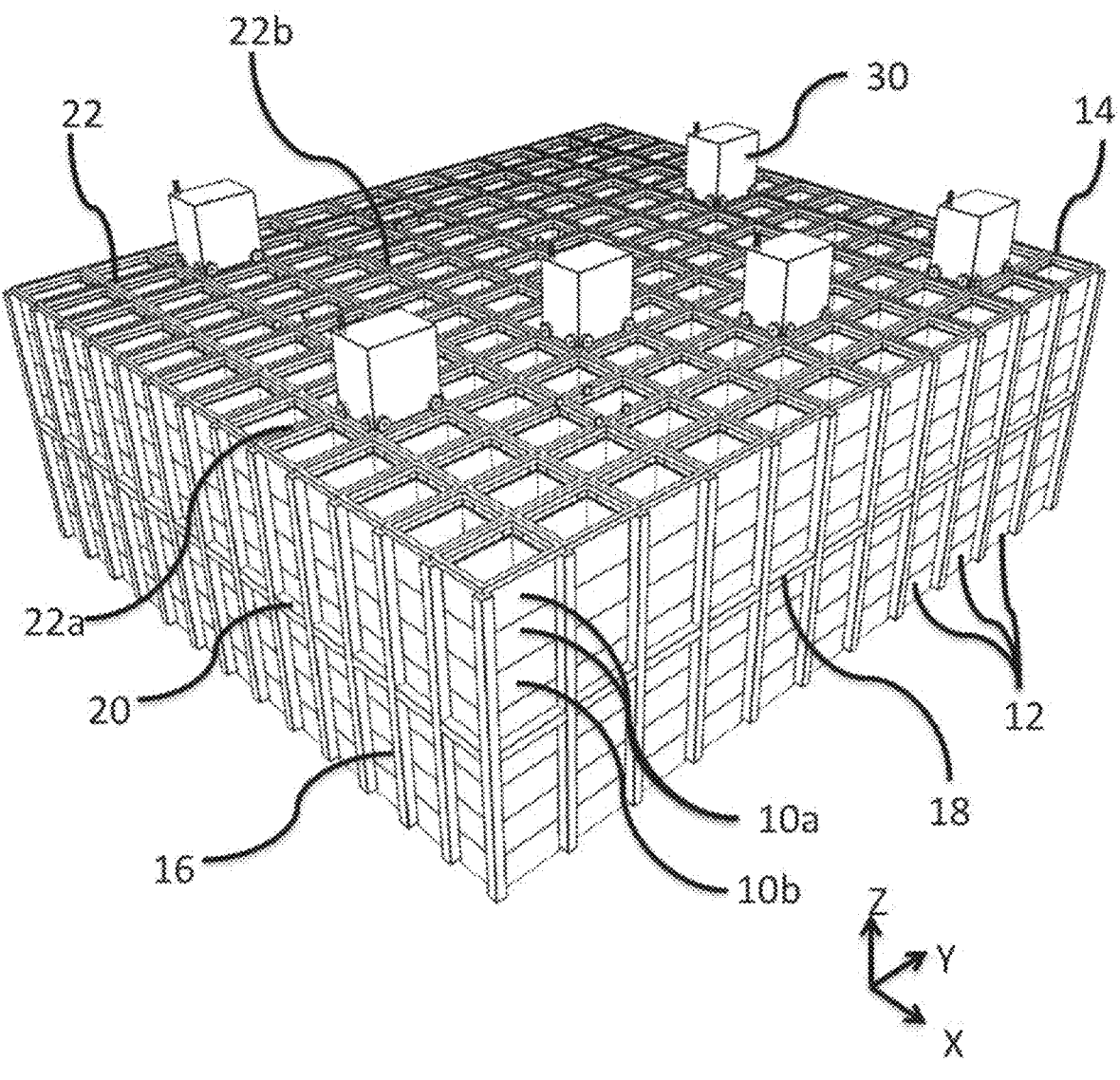
FIG. 3 is a schematic diagram of a system a known robotic load handling device operating on the grid framework structure.
Figure 4:
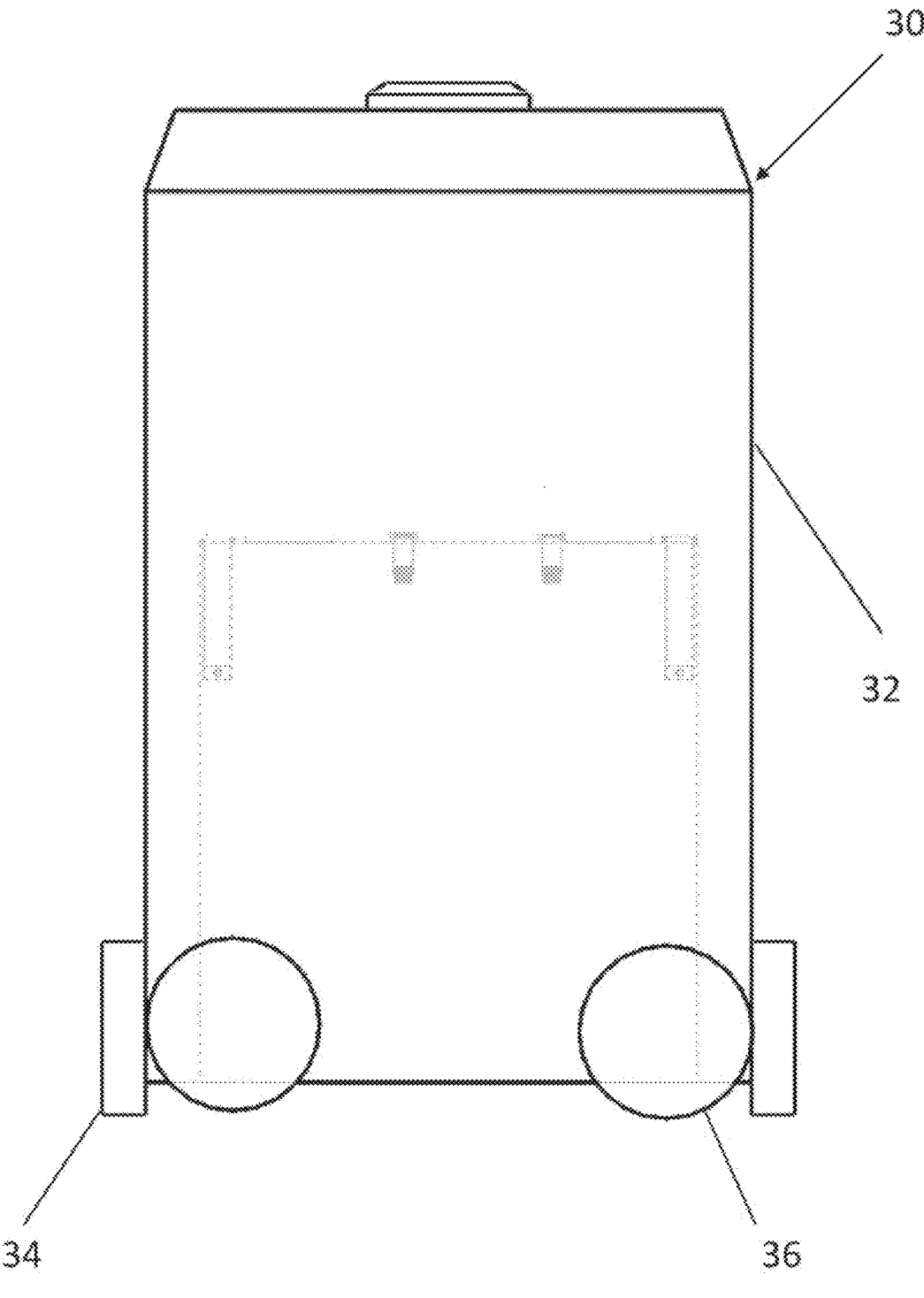
FIG. 4 is a schematic diagram of a load handling device according to a known system.
Figure 5:
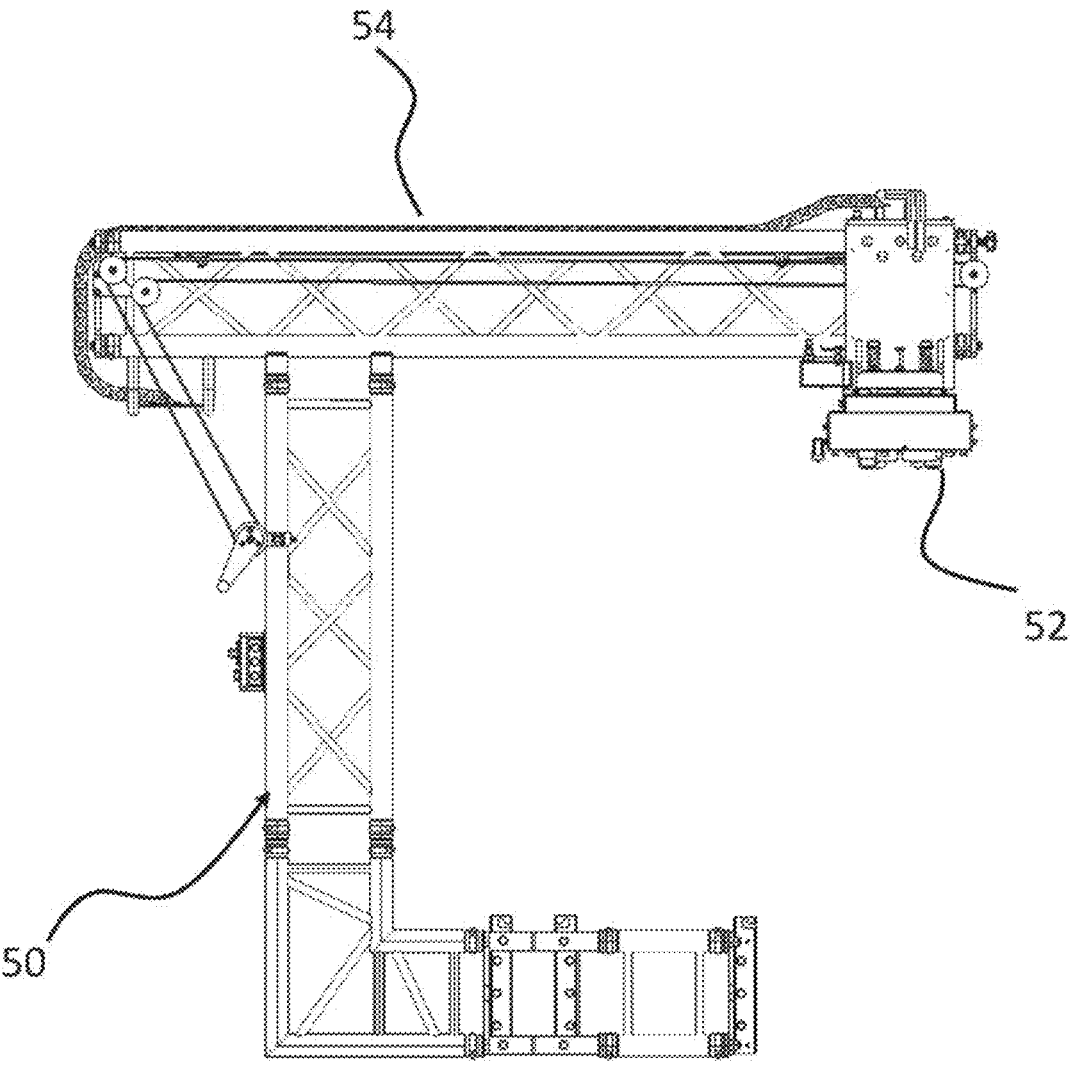
FIG. 5 is a schematic diagram showing a known charging station comprising a charge head suspended from a support structure.
Figures 6A, 6B:
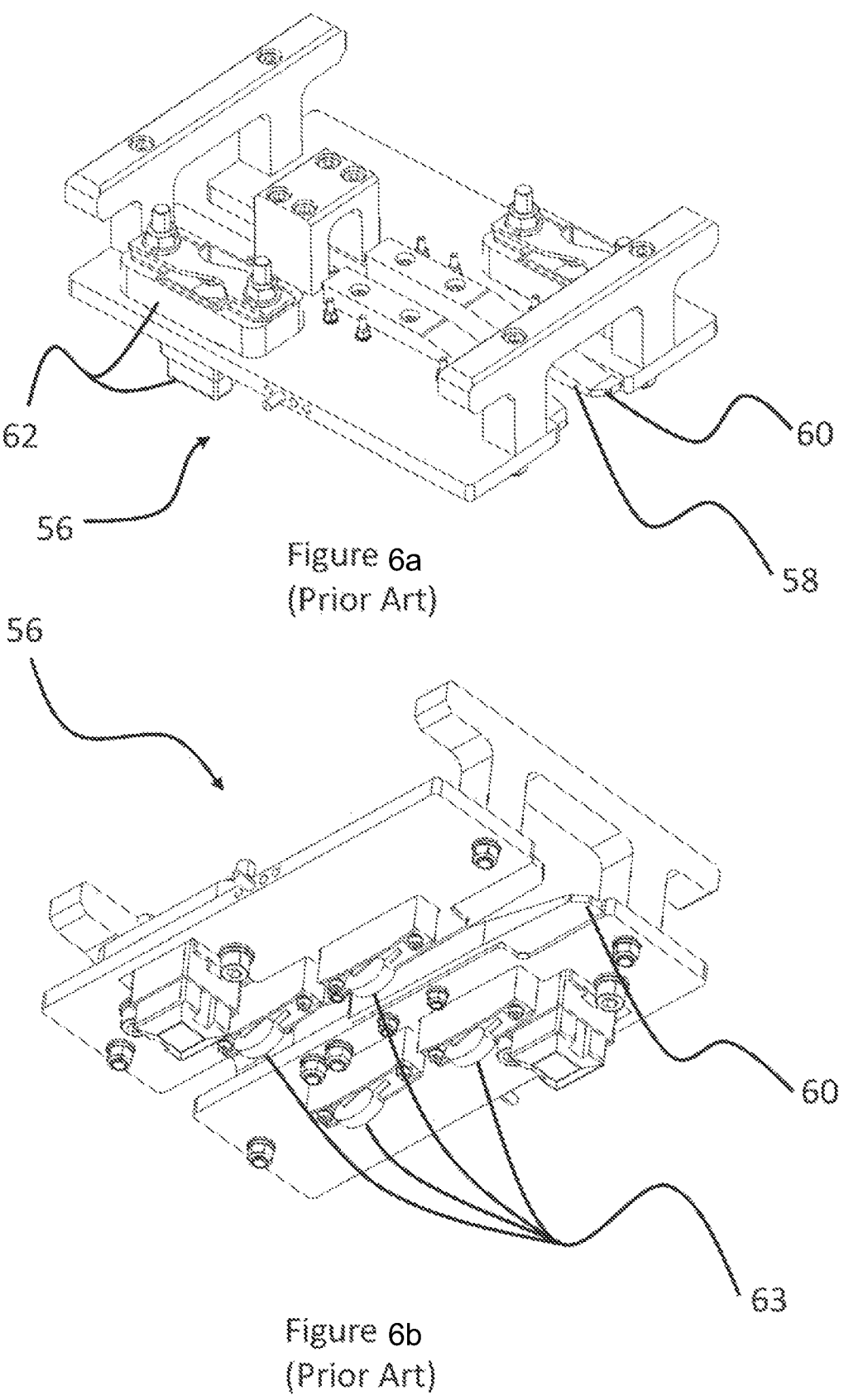
FIG. 6a is a schematic diagram from above of a known charge head showing a plurality of profiled sections.
FIG. 6b is a schematic diagram from below of the known charge head showing a power transfer unit.
Figure 7:
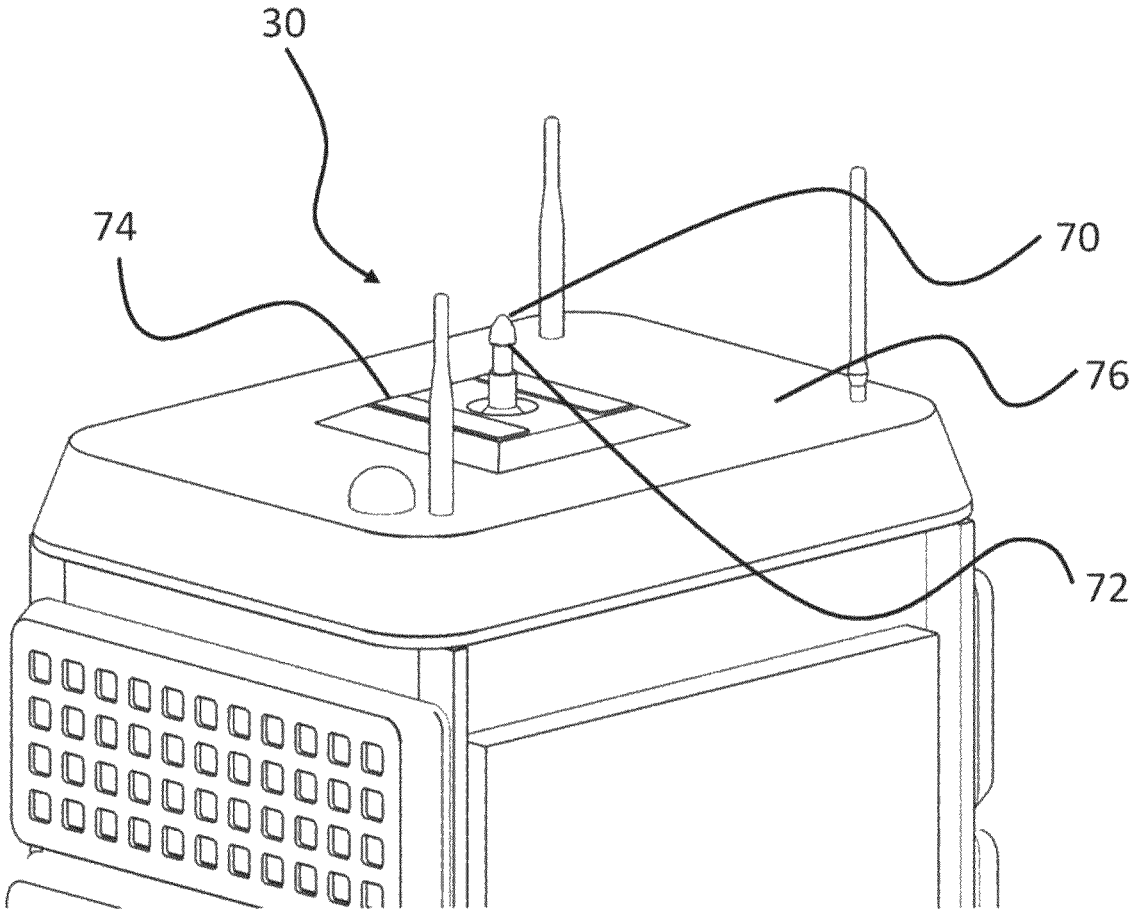
FIG. 7 is a schematic view of a top surface of a known load handling device.

The charge station 110 has a footprint that is sized to fit inside the grid space of the grid framework structure shown in FIGS. 1 and 2; more specifically the charge station 110 has a footprint that is substantially the same size as a container 110 used to store product lines. In use, when charging the battery, the load handling device 30 traverses and positions itself over a grid space occupied by the charge station 110 of the present invention. Once positioned over a grid space occupying the charge station 110 of the present invention, the load handling device in response from a signal from a controller lowers the grabber device 139 suspended from lifting tethers 38 vertically into the grid space to engage with the charge head (charge providing pads 94) of the charge station 110. Engaging the grabber device 139 of the present invention with the charge station 110 is demonstrated in FIG. 16 and FIG. 17 of the present application showing the grabber device 139 approaching into engagement with the charge station 110.

Figure 17:
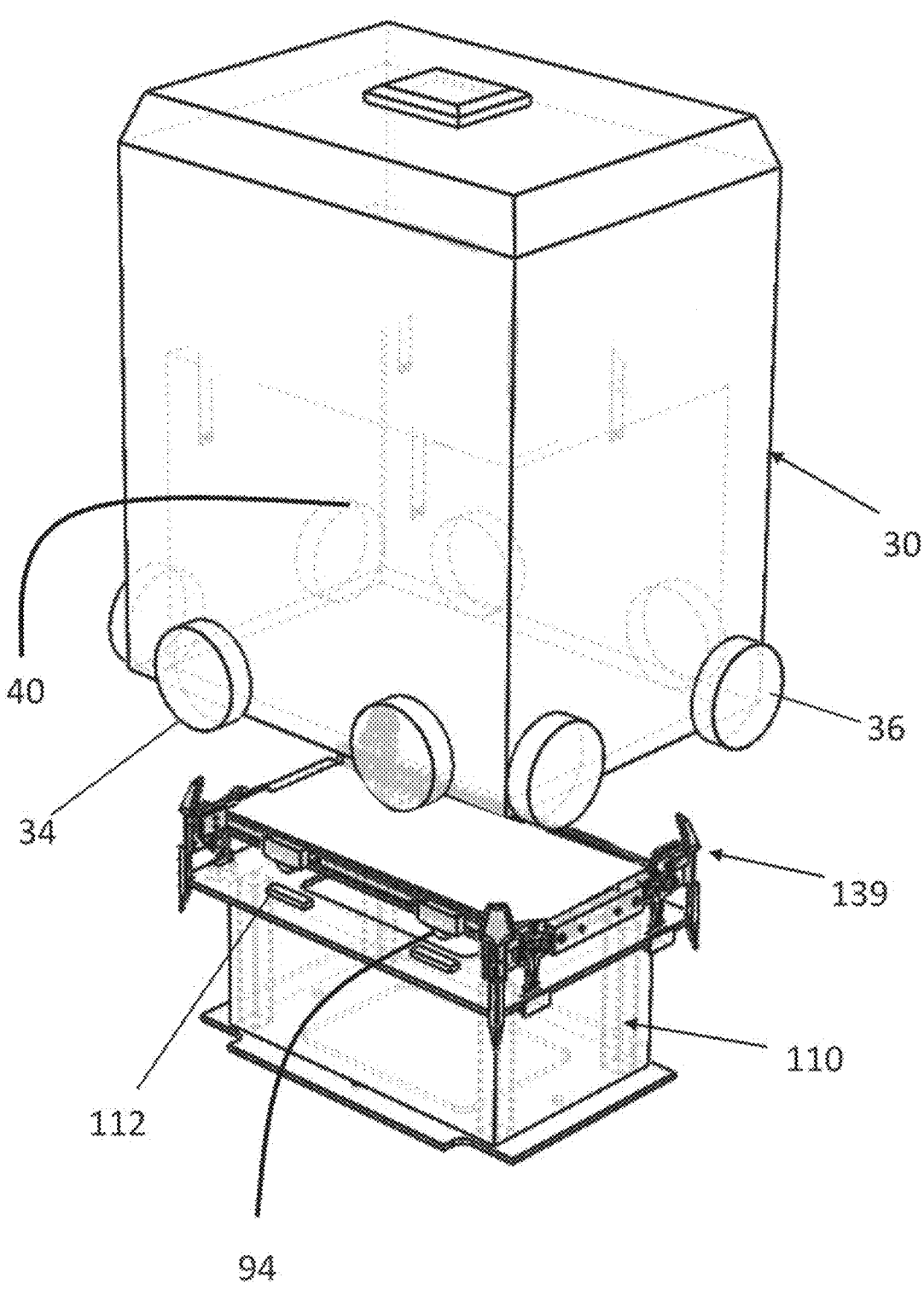
FIG. 17 is a schematic perspective overview of the load handling device and charging station according to an embodiment of the present invention.

Although FIG. 17 illustrates a load handling device occupying a single grid space where the container receiving space is a recess inside the vehicle body, the invention also encompasses a load handling device including a cantilever as part of the vehicle body, where the container receiving space is located below the cantilever arm.

Charging may be controlled by a control system commonly known in the art whereby the control system will ensure that the charge pads or the charge providing elements of the charge station supply the required current based on the condition of the rechargeable power source. The condition may be based on at least one or voltage, temperature, state of charge, depth of discharge, state of health and current as discussed above. A charging signal may be transferred through the grabber device 139 from the charge station 110 via one or more signal transfer pads or elements that are contactable when the grabber device mates with the charge station. Alternatively, required signalling between the rechargeable power source and the charge station may also be performed by suitable wireless transfer. The control system may cause the grabber device to disengage from the charge head in response to a condition of the rechargeable power source. For example, the control system actuates the gripper elements 84 to disengage from the charge head in response to a signal from the rechargeable power source indicating that the rechargeable power source has reached a predetermined depth of charge. In an event that the rechargeable power source reaches a predetermined temperature that would be a potential fire hazard, the control system instructs the grabber device to disengage from the charge head.

In operation, the gripper elements 84 of the grabber device 139 engage with the corresponding locking features 186 formed in the platform 114 of the charge station 110. As the gripper elements 84 are actuated to engage with the locking features 186 in the platform 114 of the charge station 110, the charge receiving pads 94 mounted to the underside of the grabber device 139 are drawn towards two or more charge providing pads 112 on the top surface of the platform 114 and thereby, establishes electrical contact. Electricity is then transferred from the charge station 110 via two or more electrical cables or lifting tethers 38 to the battery located in the body of the load handling device 30. As the current travelling through the electrical cables or lifting tethers can be in the order of 150-160 amps, various arc suppressing devices commonly known in the art including but not limited to solid state relays, capacitors, snubbers etc., can be used to prevent arcing at the point of electrical connection. The locking features 186 in the platform 114 are sized so that the charge receiving pads mounted to the grabber device are drawn towards the charge providing pads of the charge head with sufficient contact pressure when the gripper elements are actuated to maximise the contact surface area and thereby, minimise the electrical contact resistance between the contacts. In the particular embodiment shown in FIG. 14, the depth of the holes forming the locking features 186 are sized to draw the charge receiving pads with the charge providing pads with sufficient contact pressure to maximise contact surface area.

Figure 18:
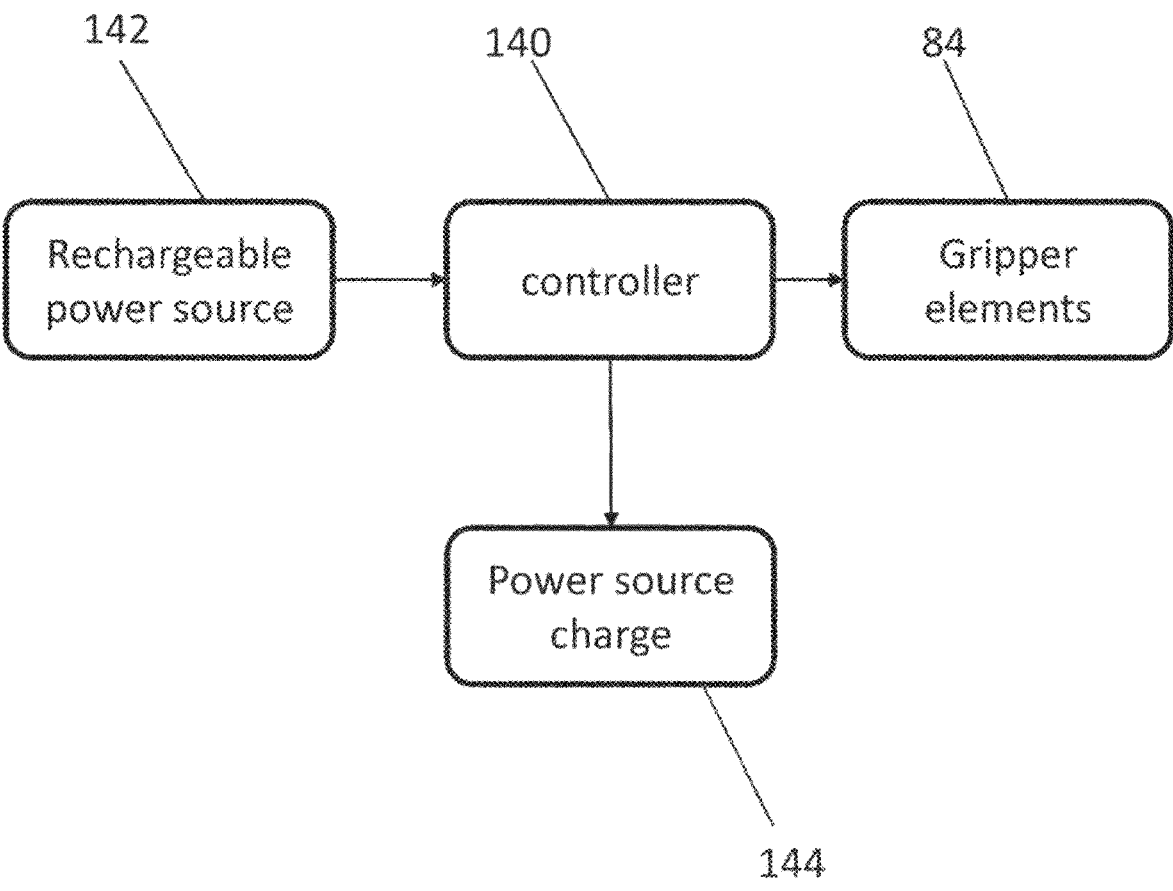
FIG. 18 is a block diagram depicting an example of the charge control system according to an embodiment of the present invention.

Charging of the rechargeable power source may be controlled by a suitable control system known in the art. The control system will ensure that the charge providing pads supply the required current based on the condition of the rechargeable power source, e.g. temperature, voltage, state of charge and current. The grabber device 139 can comprise additional contact pads that cooperate with corresponding contact pads of the charge station to feed signals on the status or the condition of the rechargeable power source to a controller. FIG. 18 is a block diagram depicting an example of the charge control system according to the present invention. When docked at the charging station, information about the health and status of the rechargeable power source 142, e.g. battery, is fed to a controller 140. Status of the rechargeable power source is input into the controller 140. When sufficient charge has been transferred to the rechargeable power source or when the rechargeable power source is fully charged, the controller 140 actuates the gripper elements 84 to release the grabber device 139 from the charge station 110 and subsequently, instructs the lifting device to raise the grabber device 139 away from the charge station 110.

When charging is completed, the grabber device 139 disengages from the charge station 110 by collapsing the gripper elements 84 to release itself from the locking features 186 in the platform 114 of the charging station 110 and thereby, break electrical contact between the charge point 92 of the grabber device 139 and the contact providing pads 112 of the charge station 110, whereupon the lifting device is able to raise the grabber device 139. Where the load handling device houses the container receiving space within the vehicle body, the lifting device raises the grabber device into the body of the load handling device 30, i.e. within the container receiving space 40 of the load handling device 30. Where the vehicle body of the load handling device includes a cantilever with the container receiving space positioned below the cantilever, the lifting device raises the grabber device up to the container receiving space below the cantilever. As discussed above, the grabber device disengages from the charge station 110 in response to a signal from the controller 140, i.e. the signal indicating that the rechargeable power source has reached a predetermined depth of charge. To prevent arcing between the contact pads when the grabber device disengages from the charge station 110, the controller switches off the power (current) being supplied to the rechargeable power source, e.g. by terminating the power at the charge station or at least reduces the current to a small or minimal value that does not present any arcing prior to the grabber device disengaging from the charge head. For example, the controller 140 switches the current off at the power source charger 144 in response to sufficient current being supplied to the rechargeable power source or when the rechargeable power source has reached a predetermined charge. Equally, the rechargeable power source automatically disconnects from the power source charger 144 once the power stored in the rechargeable power source has reached a predetermined value. Thus, when the contact pads of the grabber device and the charge station are disconnected, there is no or little arcing when the contact pads separate. One or more contact pads between the grabber device 139 and the charge head of the charge station 110 can be used to monitor the status of the rechargeable power source during charging and send the signal to the controller. Equally or additionally, additional contact pads may be present on the grabber device 139 to electrically couple with additional contact pads on the charge station to prevent or at least suppress arcing between the charge providing pads and charge receiving pads.

Figure 16:
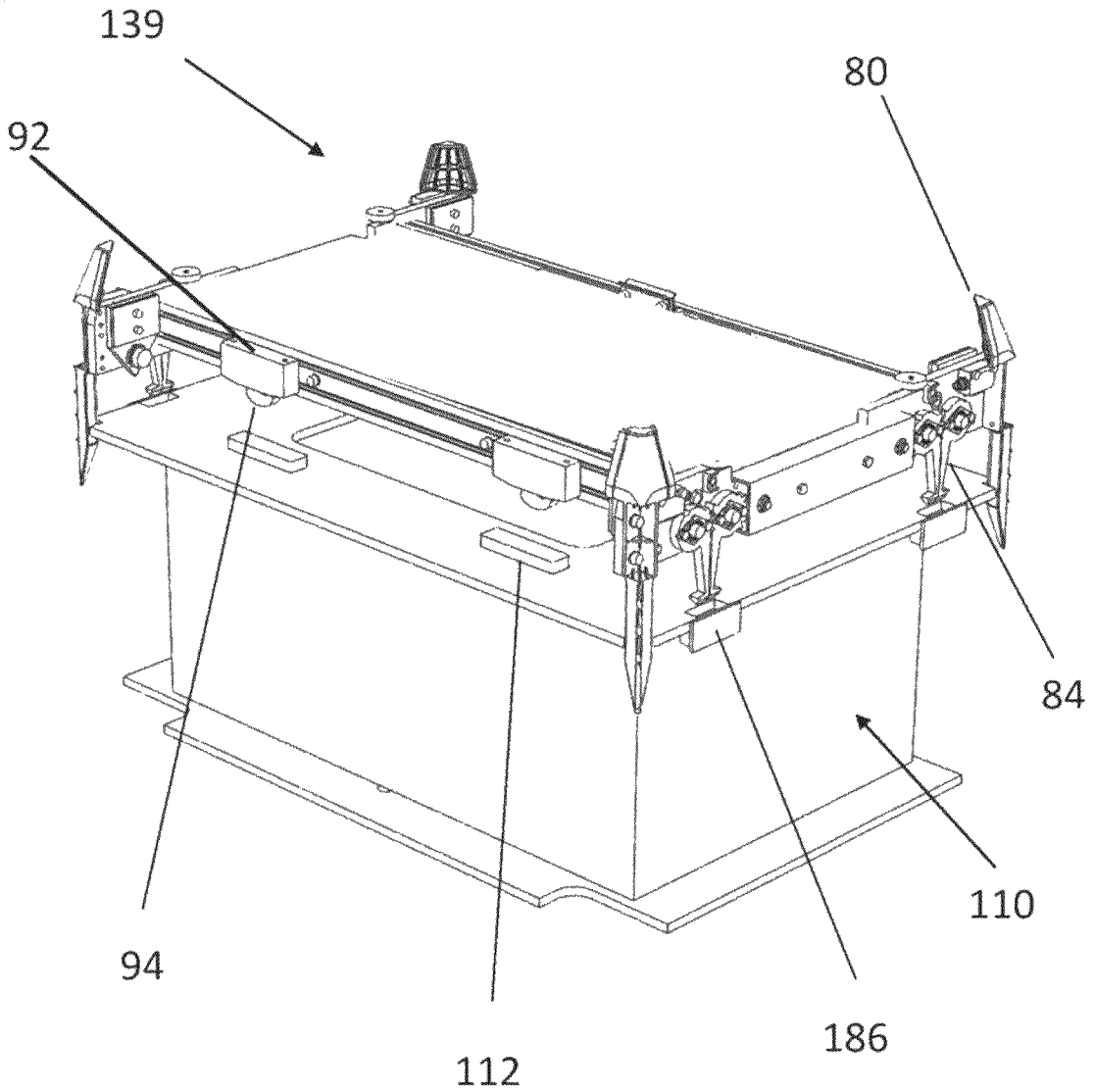
FIG. 16 is a perspective view showing electrical coupling between the charge contacts of the grabber device and the contact pads of the calibration tool according to an embodiment of the present invention.

The charge head (charge receiving pads 112) of the charge station 110 can be incorporated into a calibration tool nominally used to calibrate the length of the lifting tethers 38 so as to make sure that the grabber device is maintained in a horizontal orientation when engaging with a container in use. The calibration tool is configured to replicate the lifting operation of a container. To ensure that the lifting tethers 38 is at the correct length such that the grabber device is kept horizontal during a lifting or lowering operation, the length of the lifting tethers must be adjusted both initially, as well as at various service intervals as they tend to elongate during use. Calibration of the length of the lifting tethers involves lowering the grabber device suspended from the lifting tethers to engage with the calibration tool having a platform with locking features that resemble the locking features on a typical container. The calibration tool resembles the charge station 110 shown and described with reference to FIG. 15 above and sized to fit inside a grid space or grid cell of the grid framework structure. The platform of the calibration tool is raised or elevated to a predetermined height similar to the height of a container to replicate the lifting operation of a container. As shown in FIG. 15, the platform 114 is mounted on a plinth or pillar 115. When engaged with the grabber device, the winch is operated to remove any slack that has built up in the lifting tethers. Two or more charge providing or contact pads for charging the battery in the load handling device can be mounted to the top surface of the platform of the calibration tool to electrically couple with the at least two charge receiving contacts of the grabber device as shown in FIG. 16. Thus, during routine service intervals, the health of the battery can be monitored by a control system as discussed above and if required to be charged, power transferred to the battery via the lifting tethers or two or more dedicated electrical cables (DC- and DC+) according to the present invention by establishing electrical contact between the charge point 92 of the grabber device 139 and the charge providing pads 112 mounted to the top surface of the platform 114 of the calibration tool. Incorporating the charge station into the calibration tool provides the dual purpose of calibrating the length of the lifting tethers as well as charging the battery in a single operation. Moreover, integrating the charge station within the grid framework structure permits multiple charge stations to be incorporated within the grid framework structure rather than having externally mounted charge stations as found in prior art systems and thereby, increasing the likelihood of a charge station being nearby to a given load handling device on the grid framework structure.

The invention claimed is:

1. A load handling device for lifting and moving containers stacked in a storage system having a grid framework structure supporting a pathway arranged in a grid pattern above the stacks of containers, the load handling device comprising:

a vehicle body housing a driving mechanism operatively arranged for moving the load handling device on the grid framework structure, said driving mechanism being powered by a rechargeable power source electrically coupled to an electrical charge point for electrically coupling with a charge head of a charge station in use; and a lifting device having a lifting drive assembly and a grabber device configured, in use, to releasably grip a container and lift the container from the stack into a container-receiving space, wherein the lifting device includes the electrical charge point such that in use charging of the rechargeable power source occurs by the lifting device engaging with the charge head of the charge station, and wherein the grabber device is suspended from the vehicle body of the load handling device by a tether configured to be extended and retracted from the load handling device to move the grabber device vertically.

2. The load handling device of claim 1, wherein the electrical charge point comprises:

at least two charge receiving pads configured and arranged to be connectable to at least two charge providing pads of the charge head.

3. The load handling device of claim 1, wherein the grabber device comprises:

the electrical charge point.

4. The load handling device of claim 1, wherein the lifting drive assembly comprises:

a motor; and a winch arranged to be driven by the motor.

5. The load handling device of claim 1, wherein the grabber device is suspended from the vehicle body of the load handling device by four tethers.

6. The load handling device of claim 5, wherein the electrical charge point is electrically coupled to the rechargeable power source by:

one or more electrical cables each having a first end electrically coupled to the rechargeable power source in the vehicle body of the load handling device; and a second end electrically coupled to the electrical charge point.

7. The load handling device of claim 6, wherein the one or more electrical cables is at least partially covered in an electrically insulating sheath.

8. The load handling device of claim 6, wherein the one or more electrical cables is/are one or more of the tethers used to suspend the grabber device from the vehicle body of the load handling device.

9. The load handling device of claim 1, wherein the electrical charge point is mounted to the grabber device such that the lifting device is configured to raise and lower the electrical charge point relative to the container receiving space so that in a lowered position the electrical charge point is engageable with the charge head of the charge station.

10. The load handling device of claim 1, wherein the grabber device is configured to releasably latch to the charge head of the charge station.

11. The load handling device of claim 10, wherein the grabber device comprises:

at least two gripper elements to releasably latch to the charge head of the charge station.

12. The load handling device of claim 11, wherein the electrical charge point comprises:

the at least two gripper elements.

13. The load handling device of claim 1, wherein the electrical charge point comprises: two interface pins configured to be receivable into two corresponding receiving portions of the charge head.

14. The load handling device of claim 13, wherein the electrical charge point is configured and arranged to cooperate with the charge head by a plug and socket type configuration.

15. The load handling device of claim 1, wherein the electrical charge point is configured and arranged to cooperate with the charge head by a floating electrical connector.

16. The load handling device of claim 15, wherein the electrical charge point and the charge head of the charge station are configured to transfer power by induction.

17. The load handling device of claim 1, wherein the rechargeable power source is a battery or a capacitor.

18. A charge station comprising:

a charge head connected to a power source charger configured and arranged for cooperating with an electrical charge point of a load handling device of claim 1.

19. The charge station of claim 18, wherein the charge head is configured to cooperate with the electrical charge point of the lifting device by a plug and socket type connection or a floating electrical connection.

20. The charge station of claim 19, wherein the charge head comprises:

at least two charge providing pads configured and arranged to be connectable to charge receiving pads of the electrical charge point.

21. The charge station of claim 18, wherein the charge head is mounted to a platform.

22. The charge station of claims 21, wherein the charge station is a calibration tool configured for calibrating the lifting drive assembly of the lifting device, wherein the platform comprises:

one or more locking features for engaging with the grabber device of the lifting device.

23. The charge station of claim 21, wherein the platform is mounted on a plinth or pillar.

24. A storage system comprising:

a first set of parallel pathways and a second set of parallel pathways running transversely to the first set in a substantially horizontal plane to form a grid pattern having a plurality of grid spaces or grid cells;

a plurality of stacks of containers located beneath the first set of parallel pathways and second set of parallel pathways, wherein each of the stacks of containers occupies a single grid space or grid cell; and a load handling device as claimed in claim 1, configured and arranged to traverse along the first set and the second set of parallel pathways over the plurality of grid spaces or grid cells such that when positioned above a stack of containers occupying a grid space or grid cell, the lifting device is arranged to lift at least one container from said stack of containers wherein:

at least one of the grid spaces or grid cells includes a charge station having the charge head configured to electrically charge the rechargeable power source of the load handling device.

25. The storage system of claim 24, wherein the charge station is sized to fit inside a grid space or grid cell.

26. The storage system of claim 25, wherein the load handling device is configured and operatively arranged to traverse over a grid space or grid cell occupying a charge station and charge the rechargeable power source by engaging the grabber device with the charge station.

27. The storage system of claim 24, wherein the grabber device is configured to engage with and/or disengage from the charge station in response to a signal from a controller.

28. The storage system of claim 27, wherein the grabber device is configured to electrically couple with the charge station when the grabber device engages with the charge station.

29. The storage system of claim 27, wherein the controller is configured to actuate an actuator to engage with and/or disengage from the grabber device from the charge station.

30. The storage system of claim 27, wherein the signal represents a condition of the rechargeable power source.

31. The storage system of claim 30, wherein the condition is any one of voltage, and/or current, and/or temperature, and/or state of charge and/or depth of discharge.

32. A method for charging a rechargeable power source in a load handling device for lifting and moving containers stacked in a storage system having a grid framework structure supporting a pathway arranged in a grid pattern above the stacks of containers, the load handling device including:

a vehicle body housing a driving mechanism operatively arranged for moving the load handling device on the grid framework structure, said driving mechanism being powered by a rechargeable power source electrically coupled to an electrical charge point for electrically coupling with a charge head of a charge station in use; and a lifting device having a lifting drive assembly and a grabber device configured, in use, to releasably grip a container and lift the container from the stack into a container-receiving space, wherein the lifting device includes the electrical charge point such that in use charging of the rechargeable power source occurs by the lifting device engaging with the charge head of the charge station, and wherein the grabber device is suspended from the vehicle body of the load handling device by a tether configured to be extended and retracted from the load handling device to move the grabber device vertically, the method comprising:

i) moving the load handling device over a grid space occupying the charge station;

ii) lowering the grabber device to engage with the charge station in the grid space such that an electrical contact is established between the charge point of the grabber device and the charge head of the charge station; and iii) transferring power from the charge station to the rechargeable power source.

33. The method of claim 32, comprising:

iv) determining a condition of the rechargeable power source, wherein the condition is any one of voltage, and/or current, and/or temperature, and/or state of charge and/or depth of discharge;

v) dis-engaging the grabber device from the charge station so as to disconnect the electrical charge point from the charge head when the rechargeable power source reaches a predetermined condition; and vi) raising the grabber device up to the vehicle body of the load handling device.

* * * * *